Jan. 14, 1930.  H. CARLE  1,743,424
FLAT BOTTOM CUP MAKING MACHINE
Filed Oct. 18, 1926  23 Sheets-Sheet 5

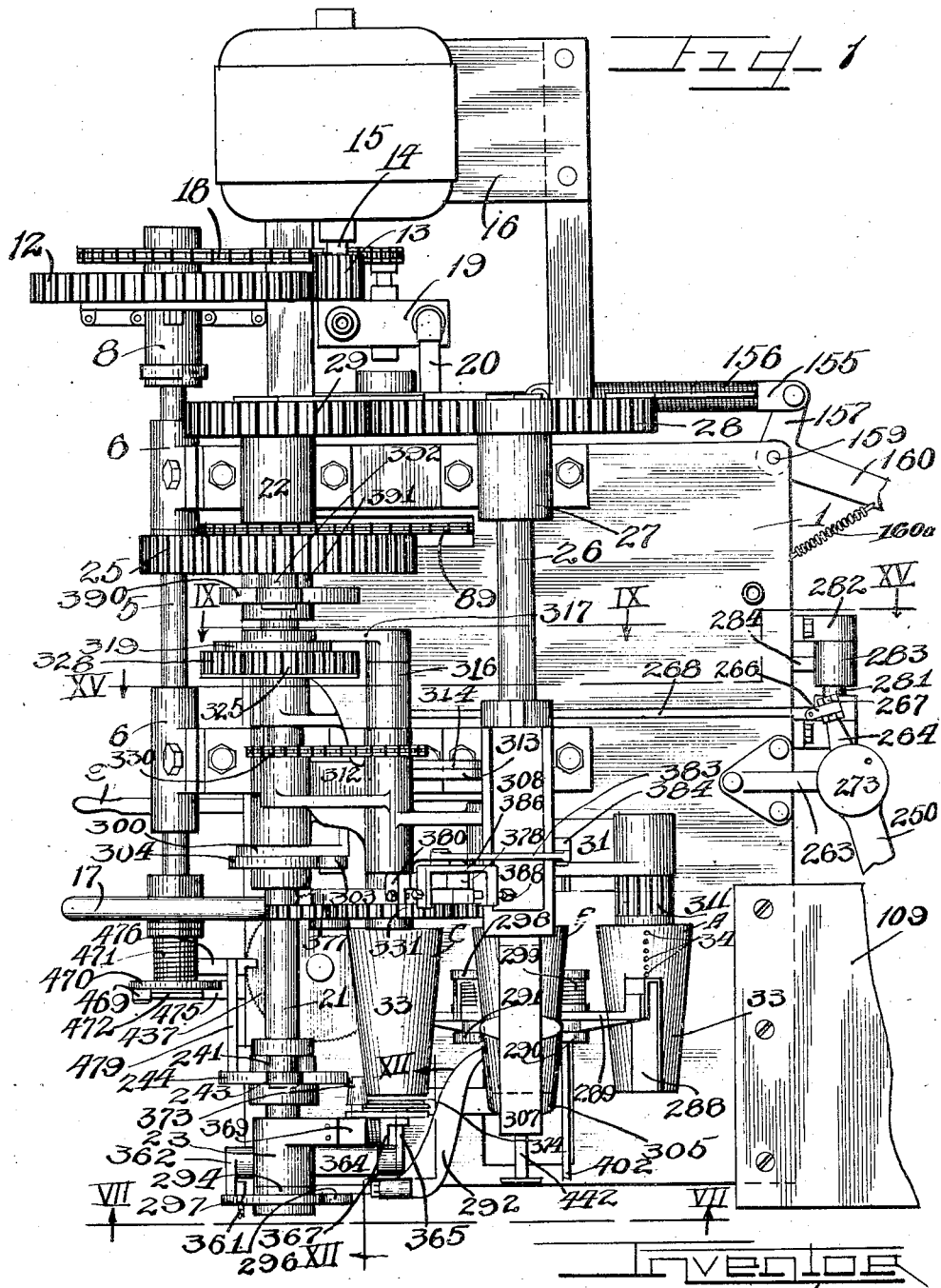

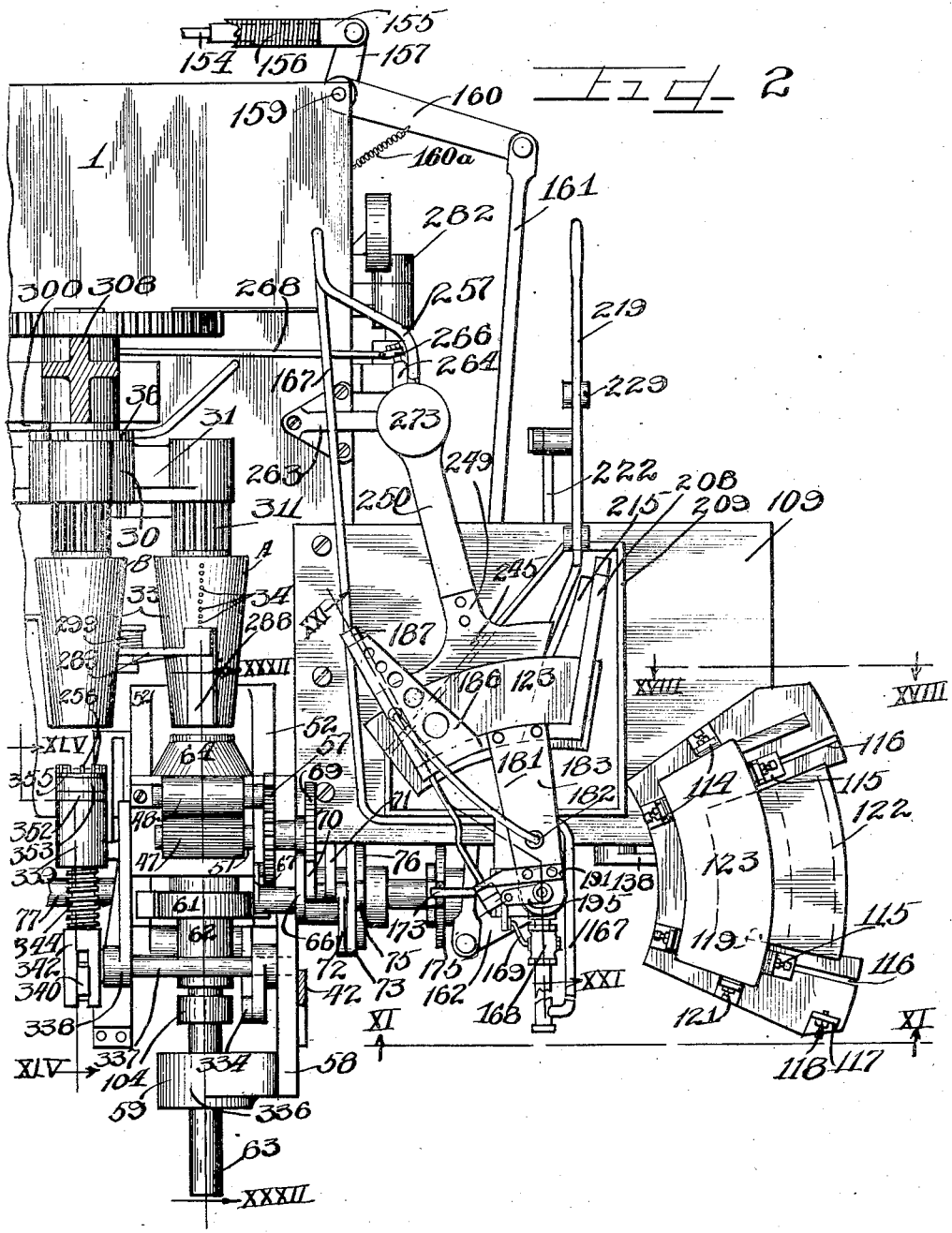

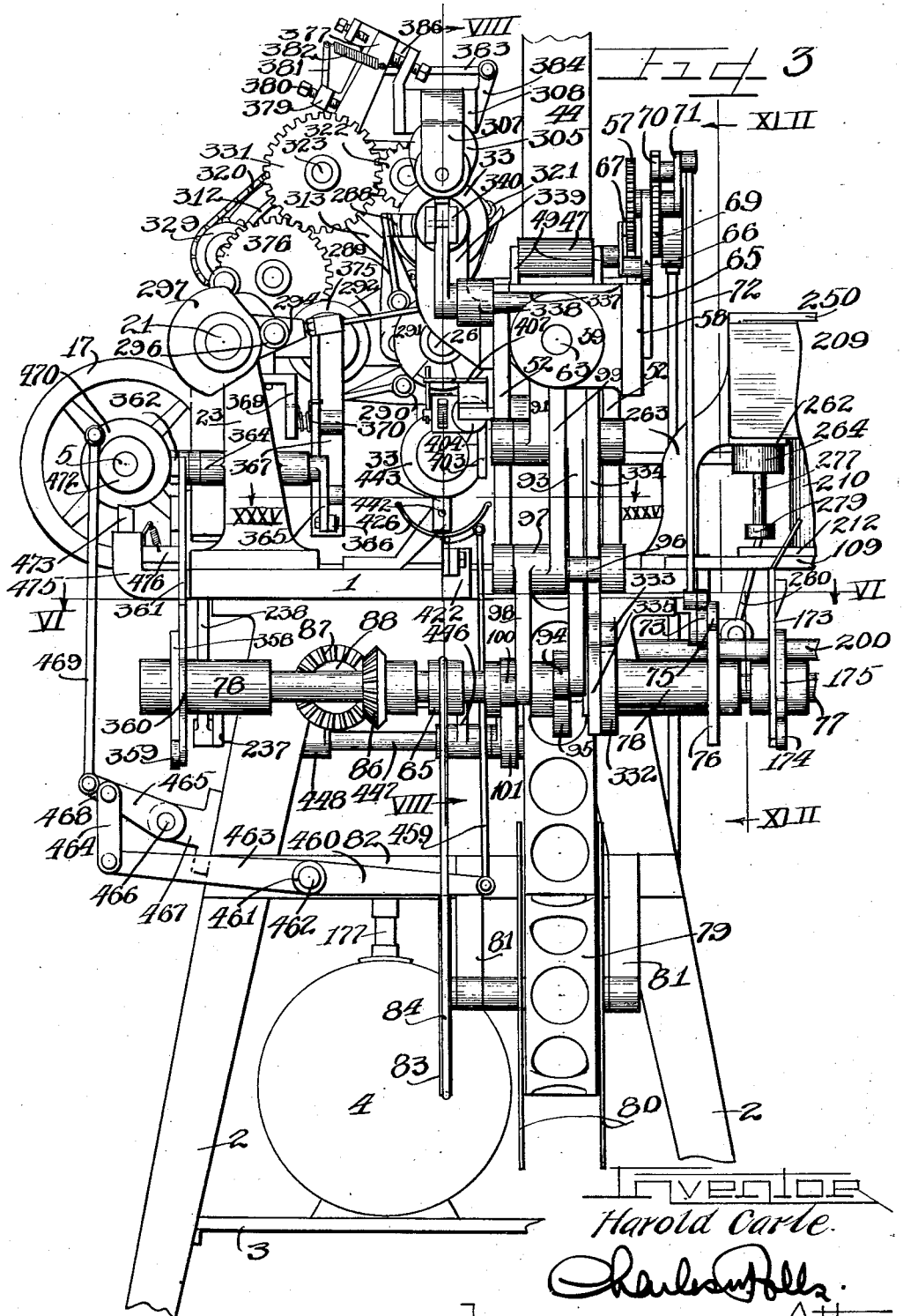

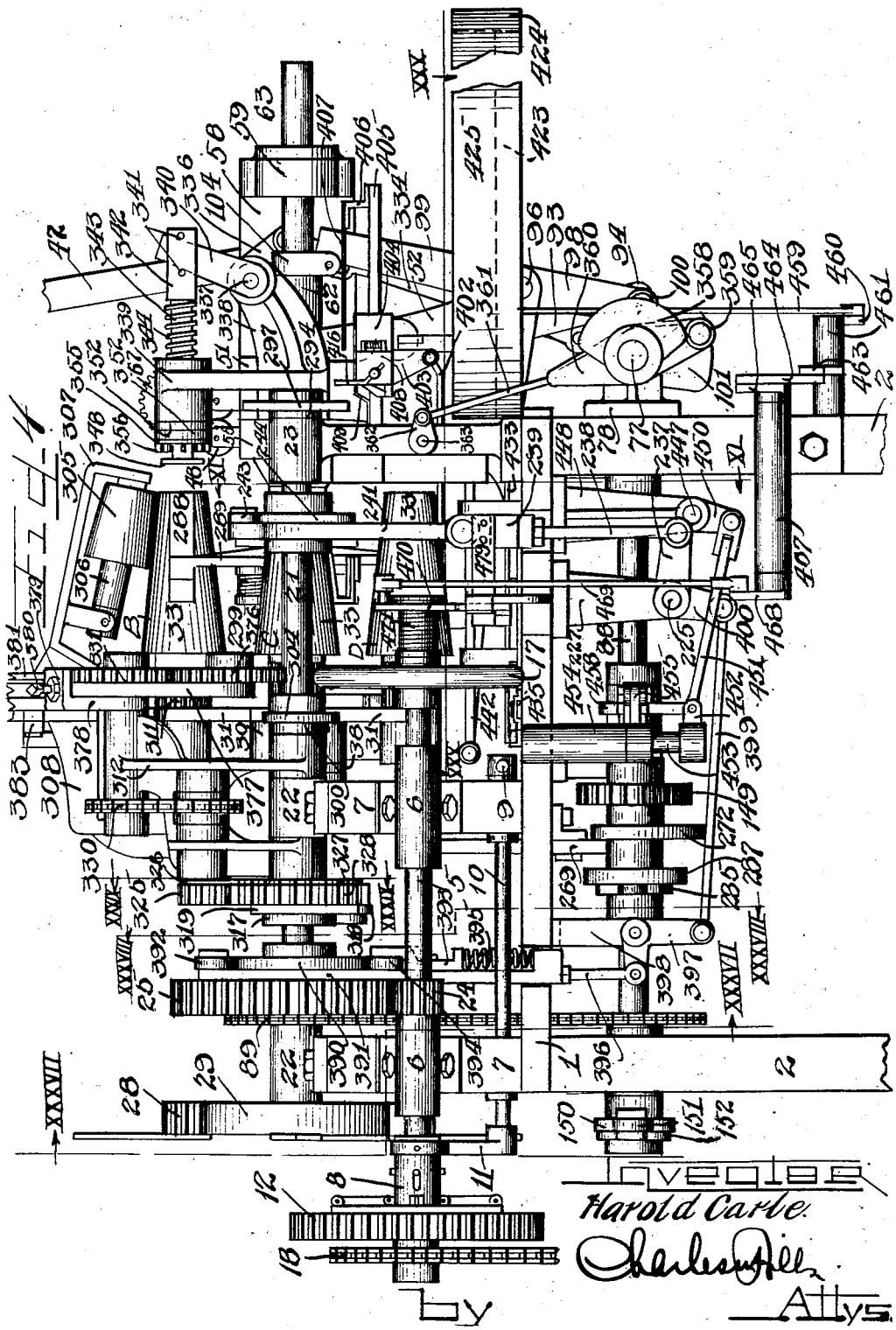

INVENTOR
Harold Carle
by Charles... 
Attys

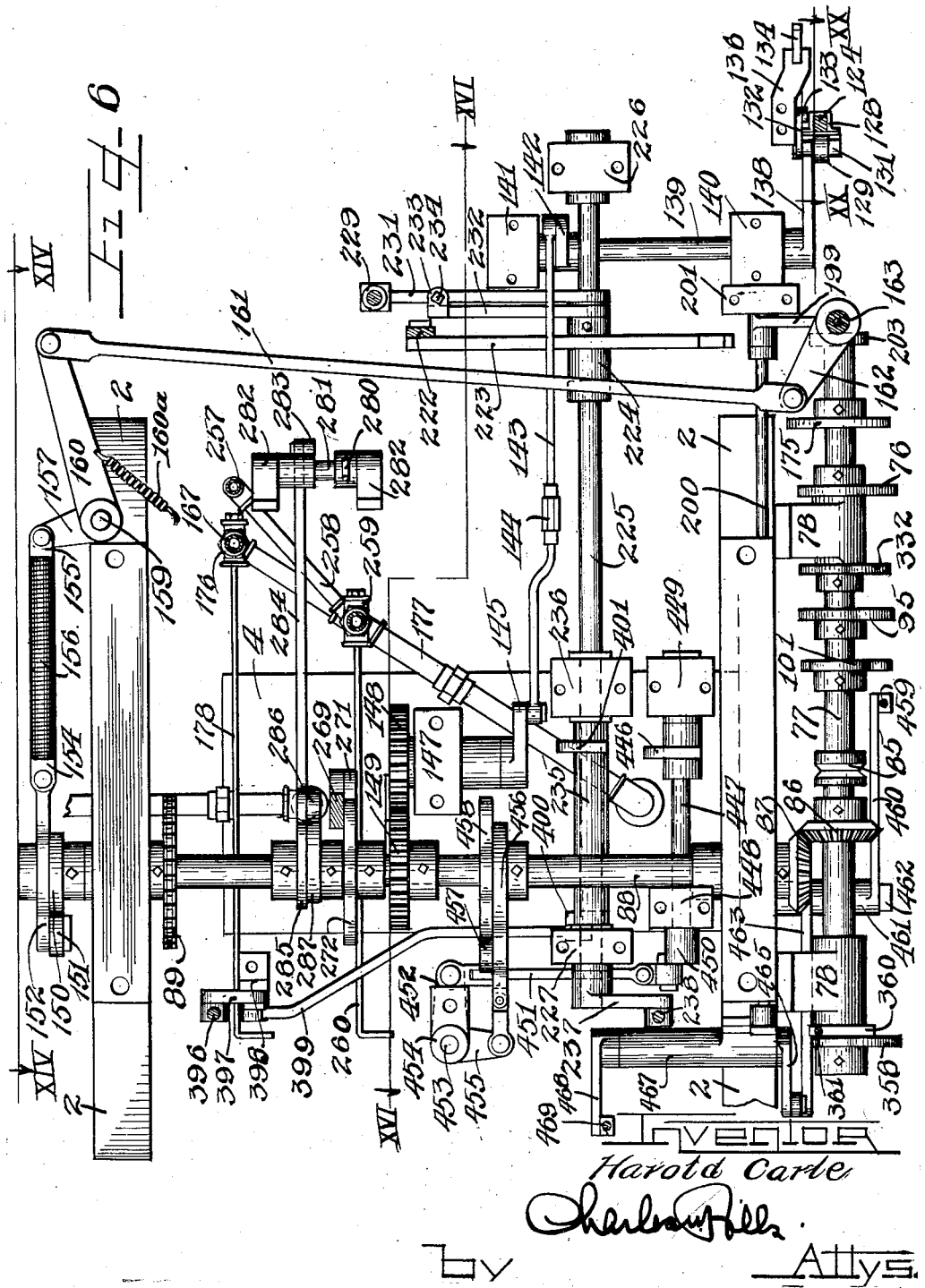

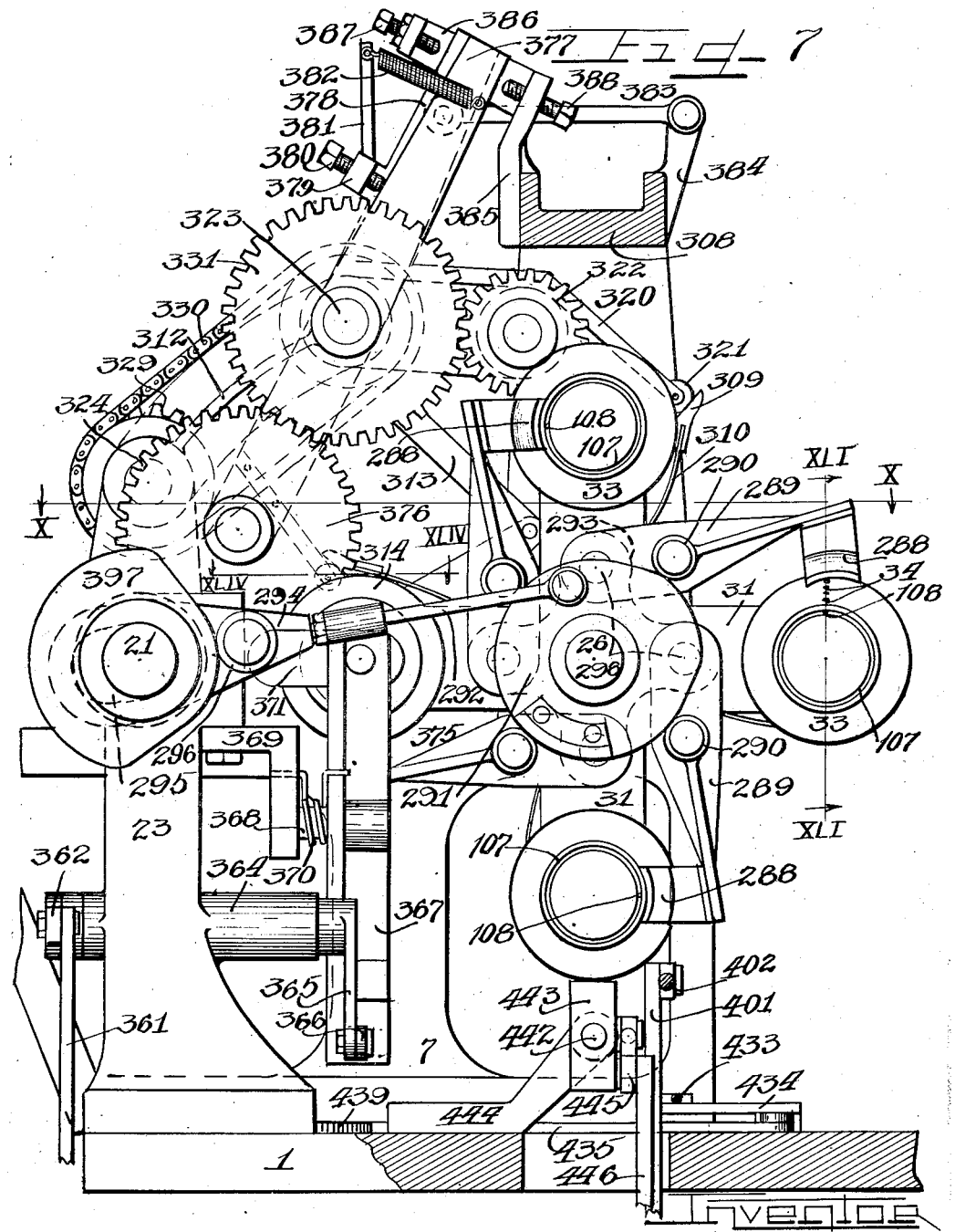

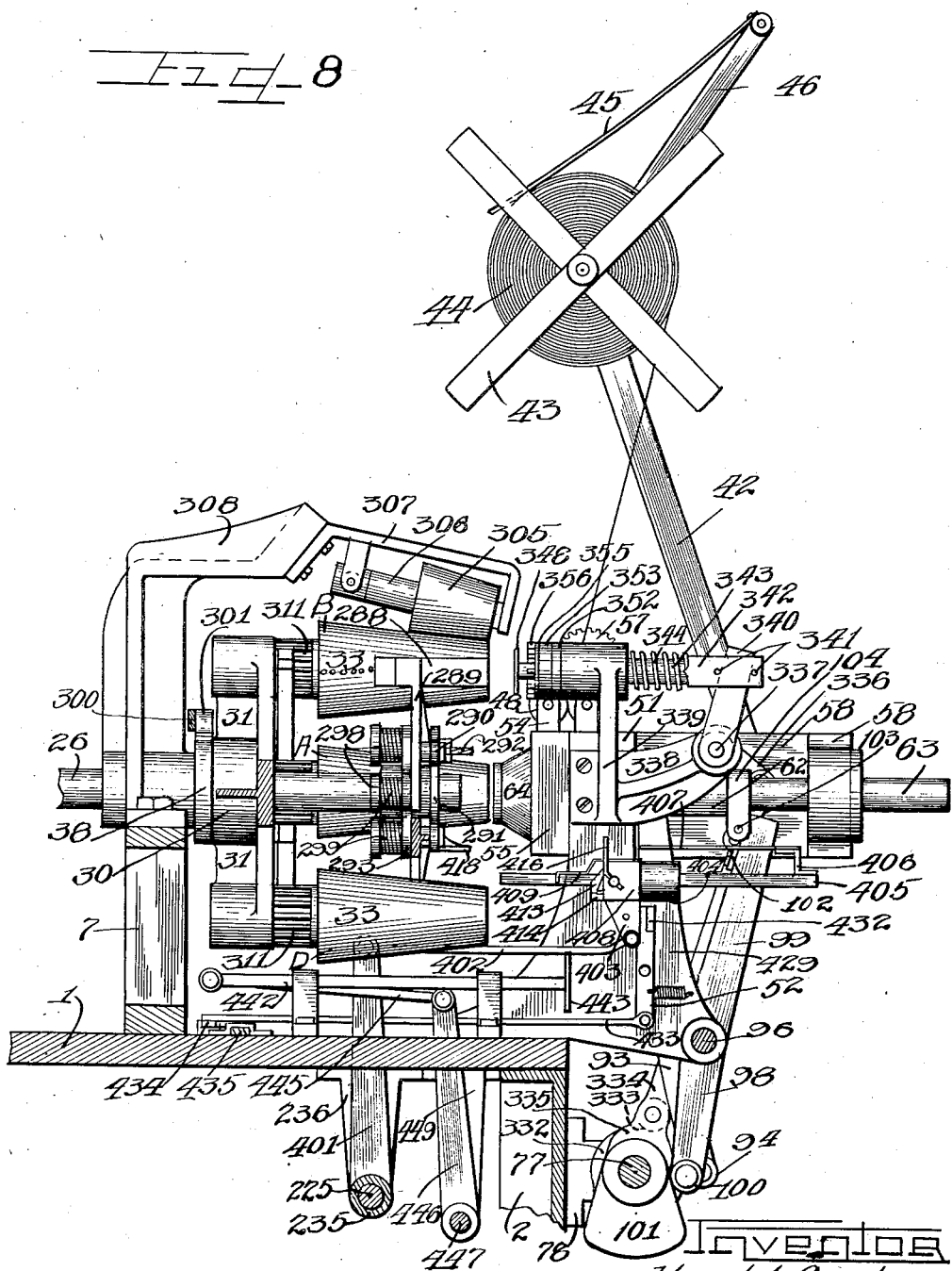

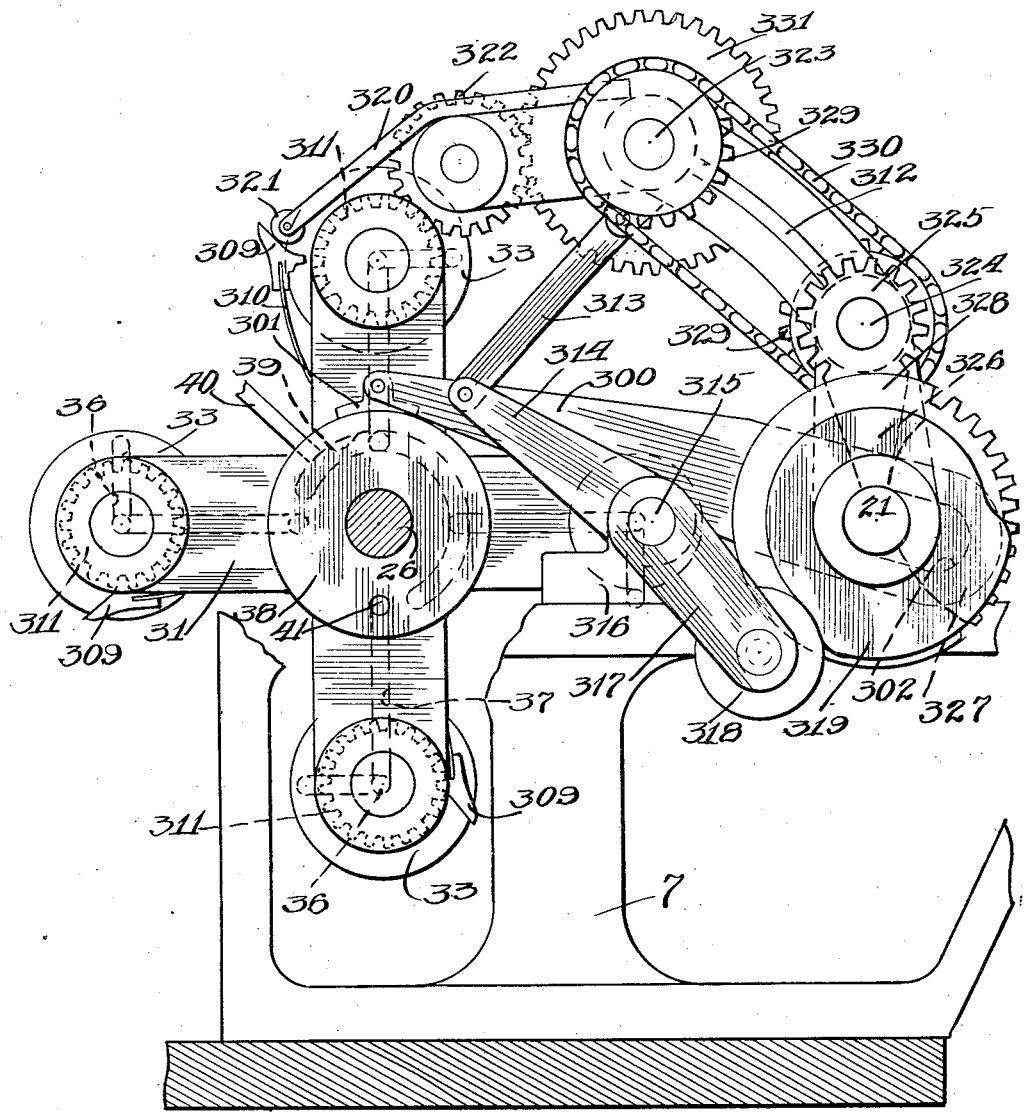

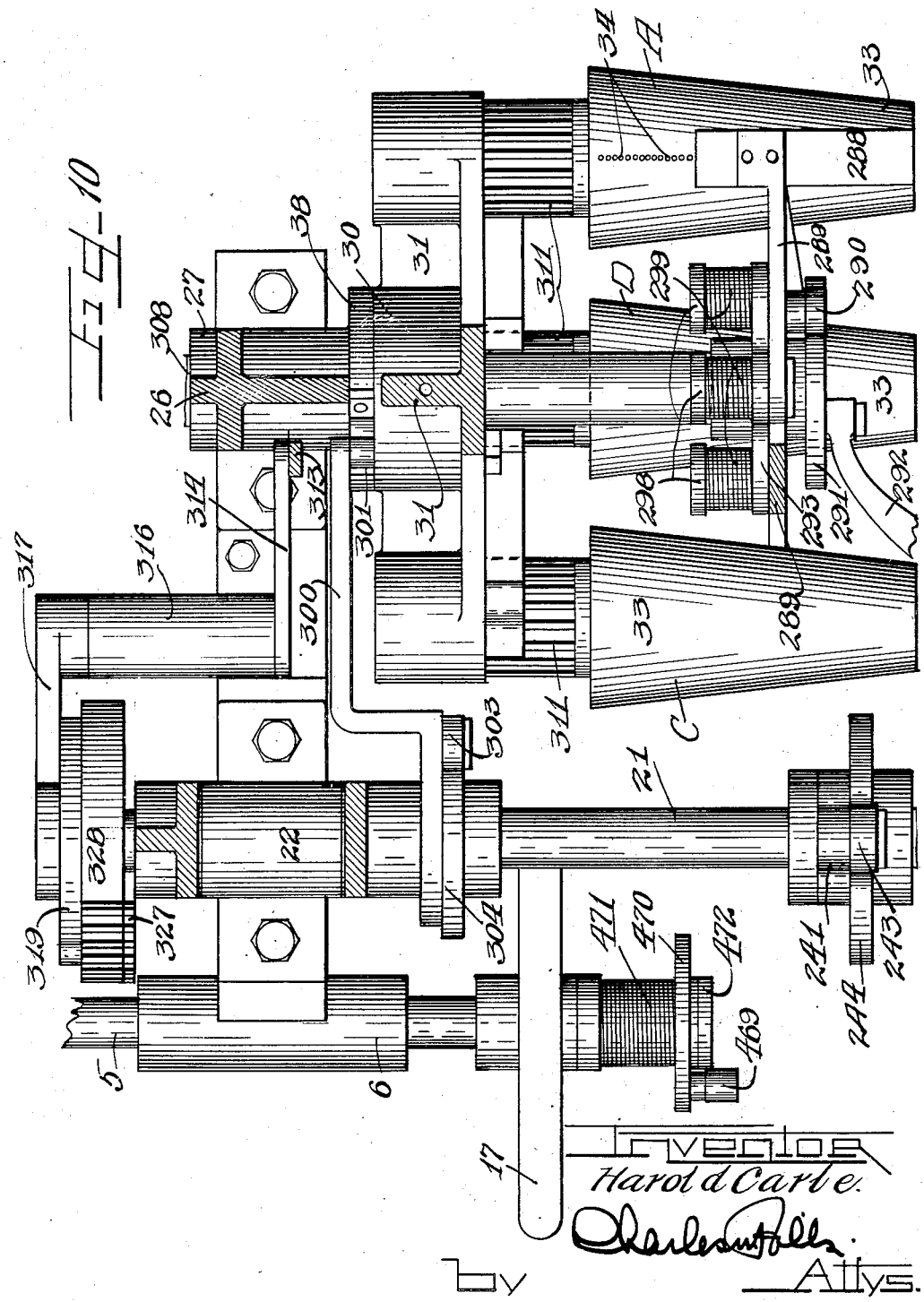

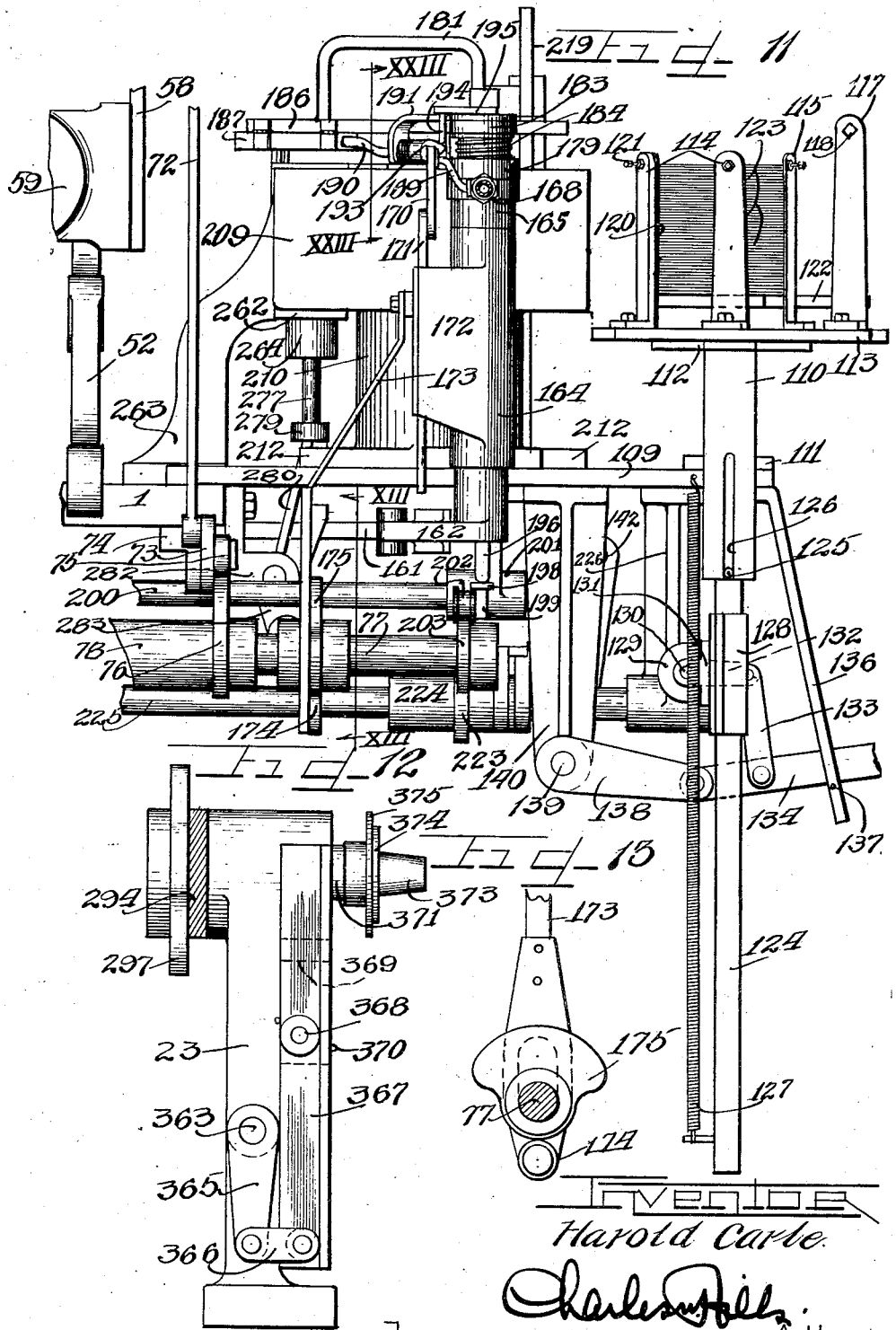

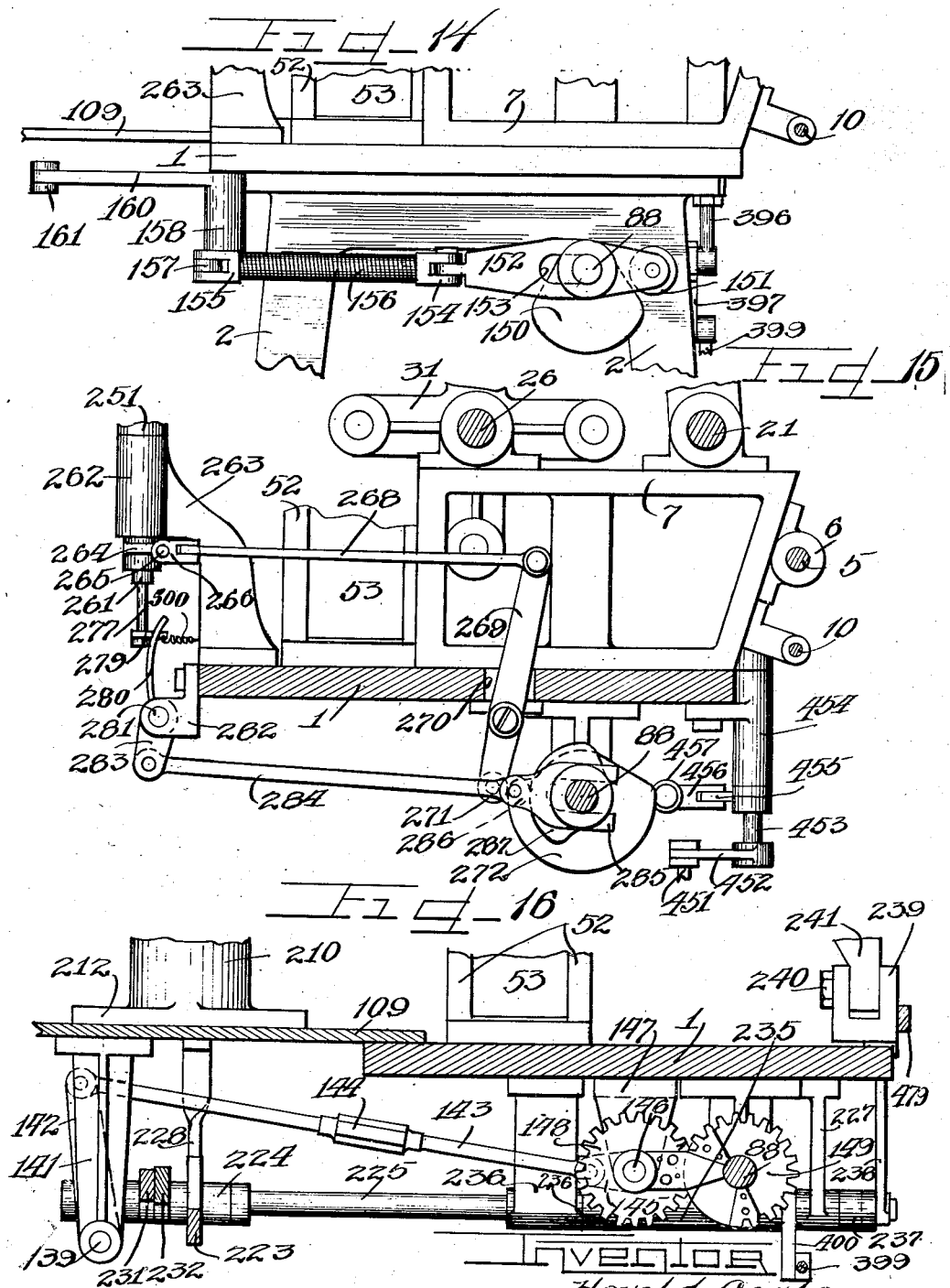

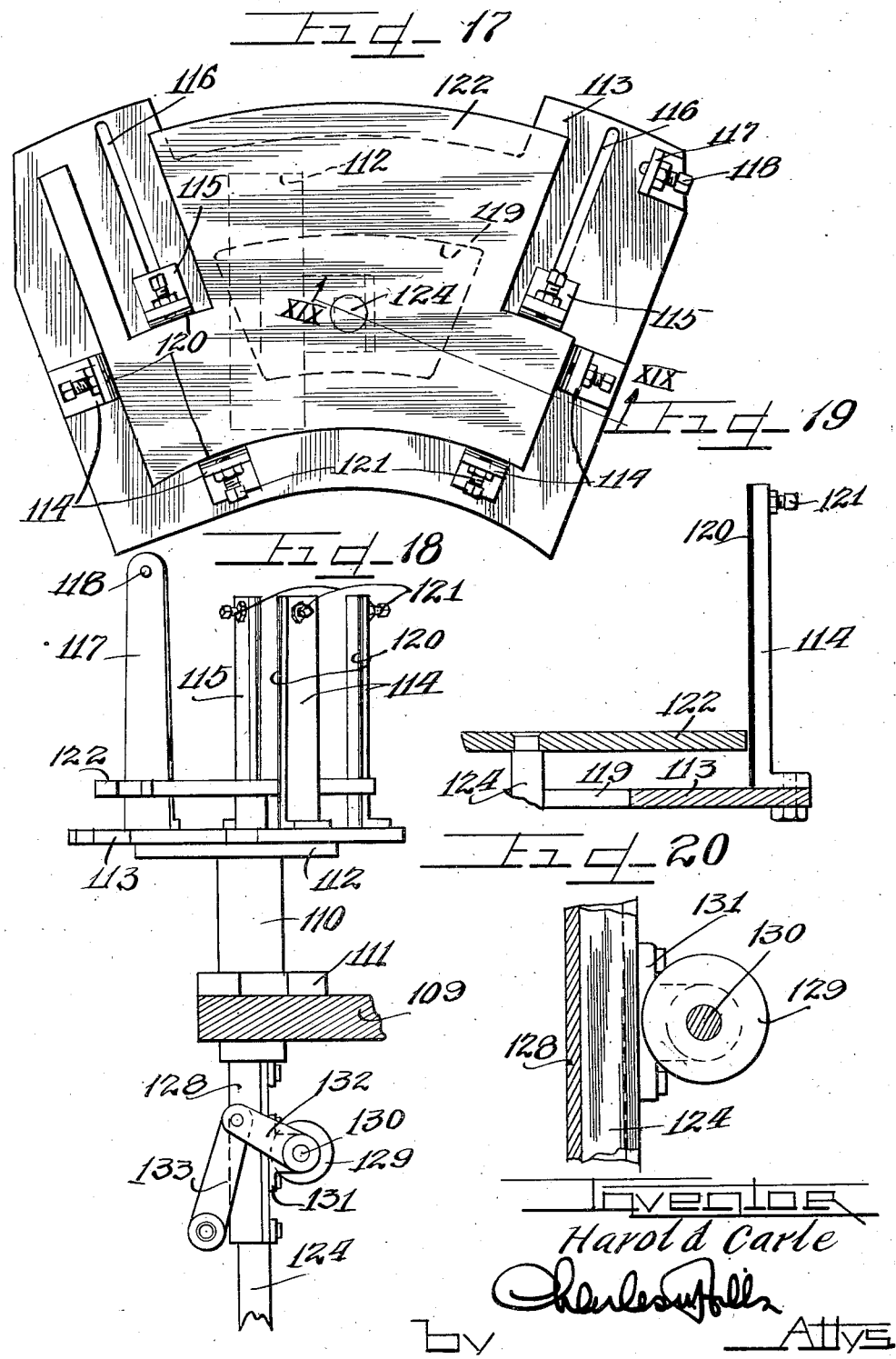

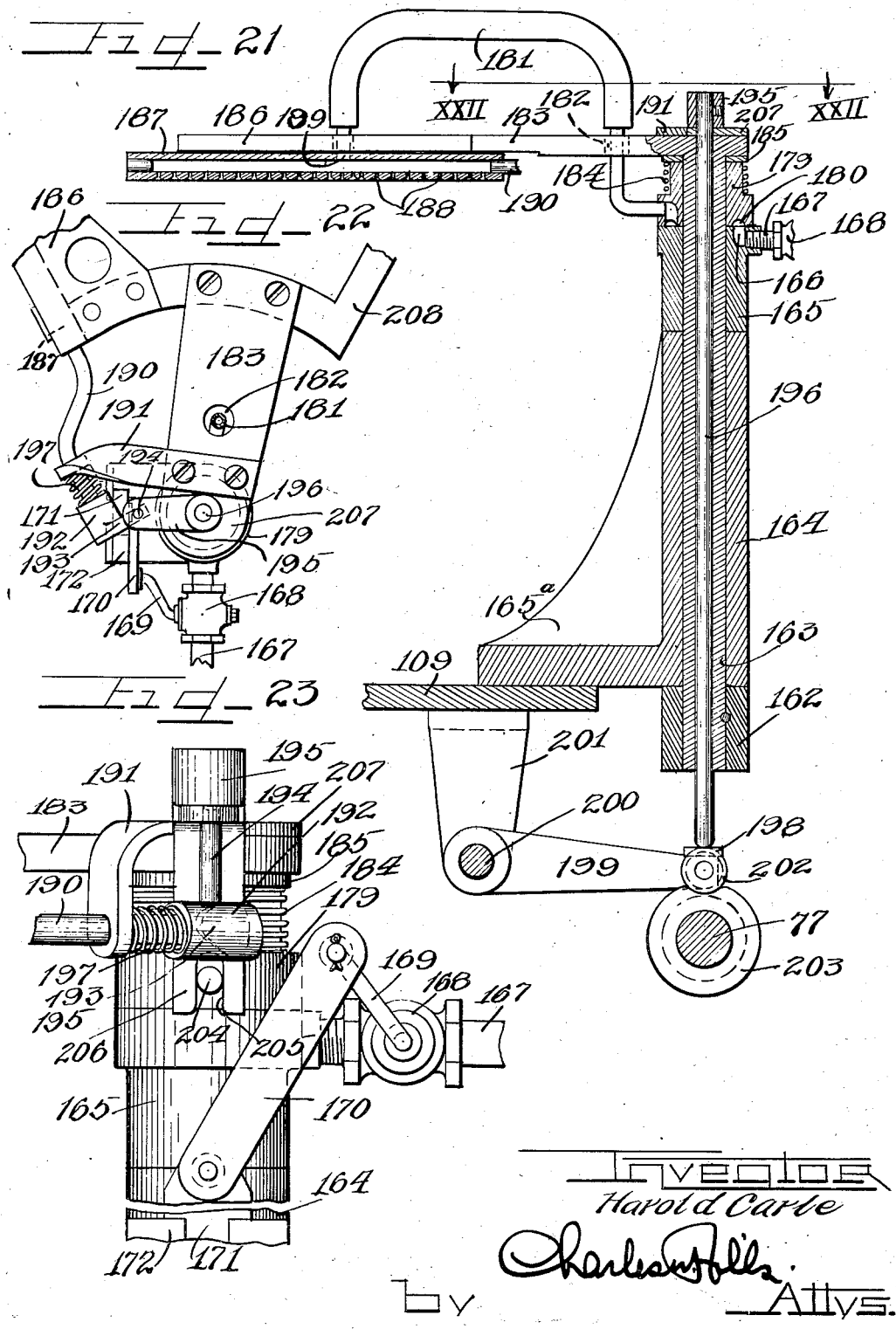

Jan. 14, 1930.  H. CARLE  1,743,424
FLAT BOTTOM CUP MAKING MACHINE
Filed Oct. 18, 1926   23 Sheets-Sheet 15
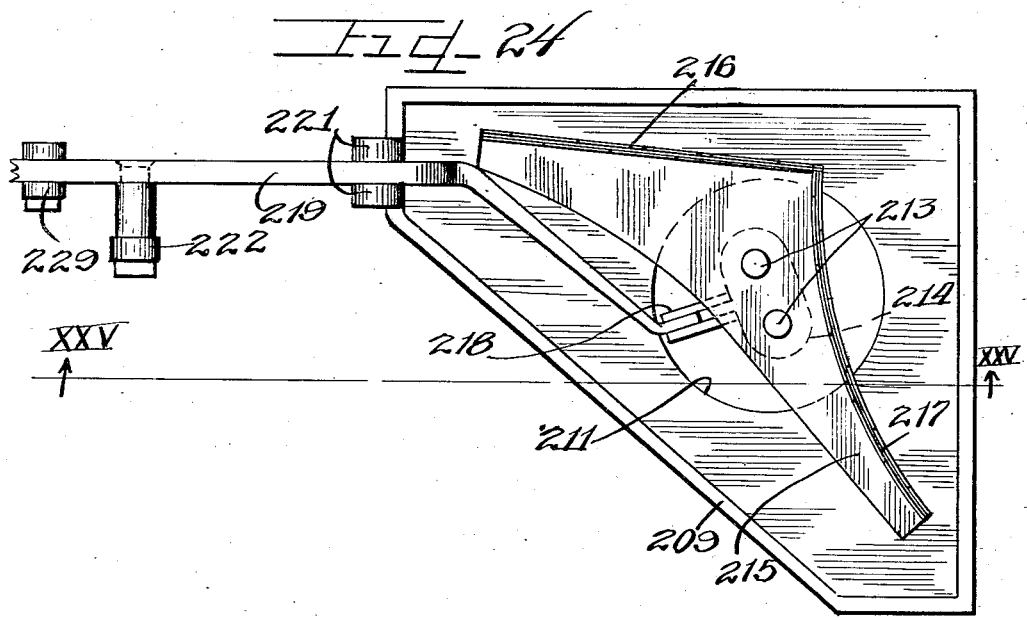
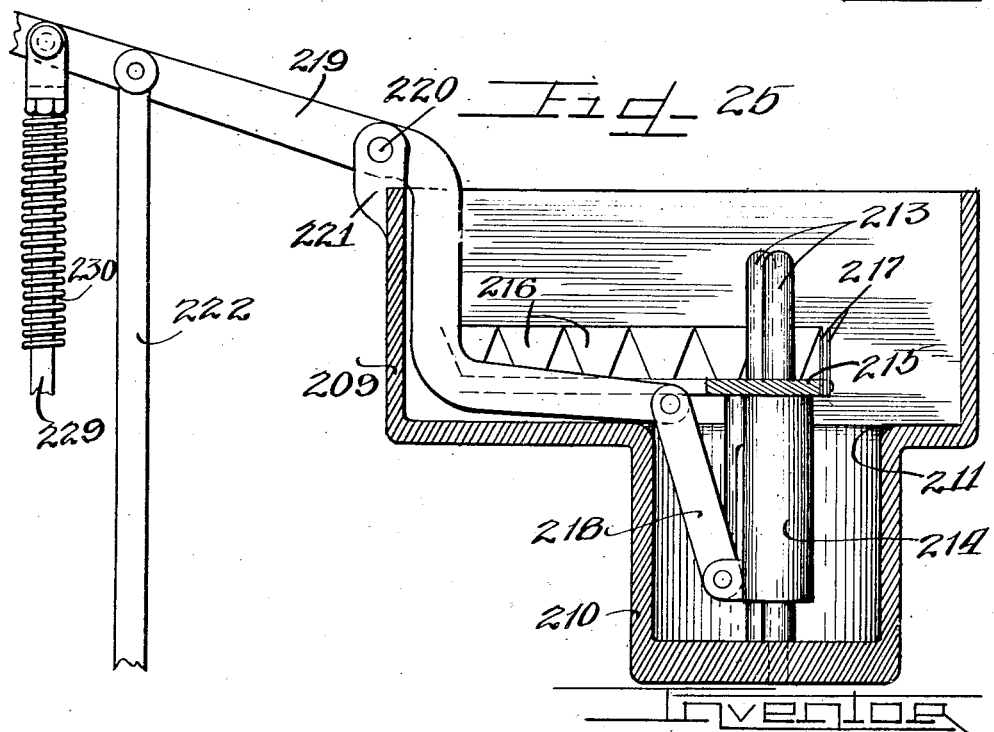
Inventor
Harold Carle
by Charles... Attys.

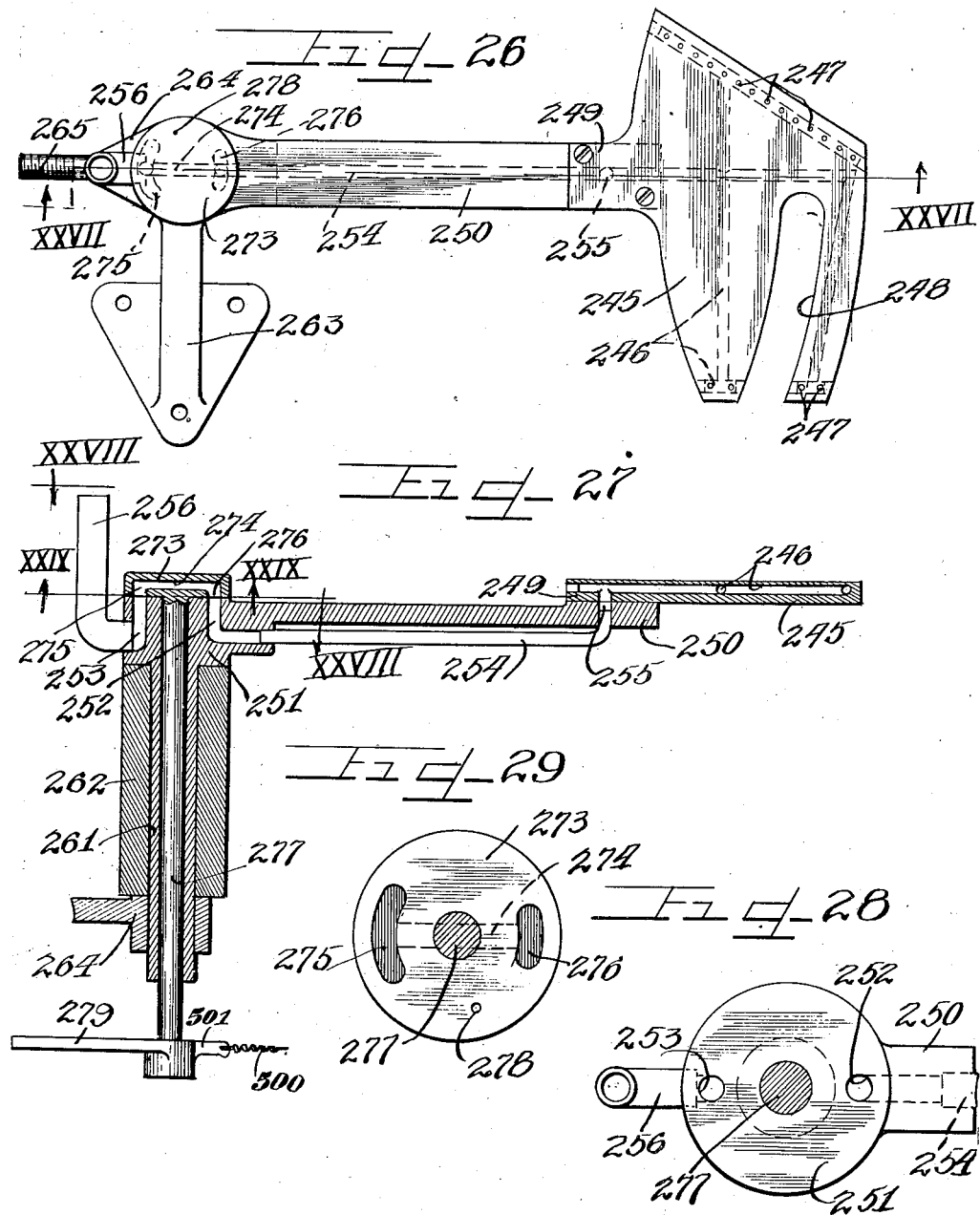

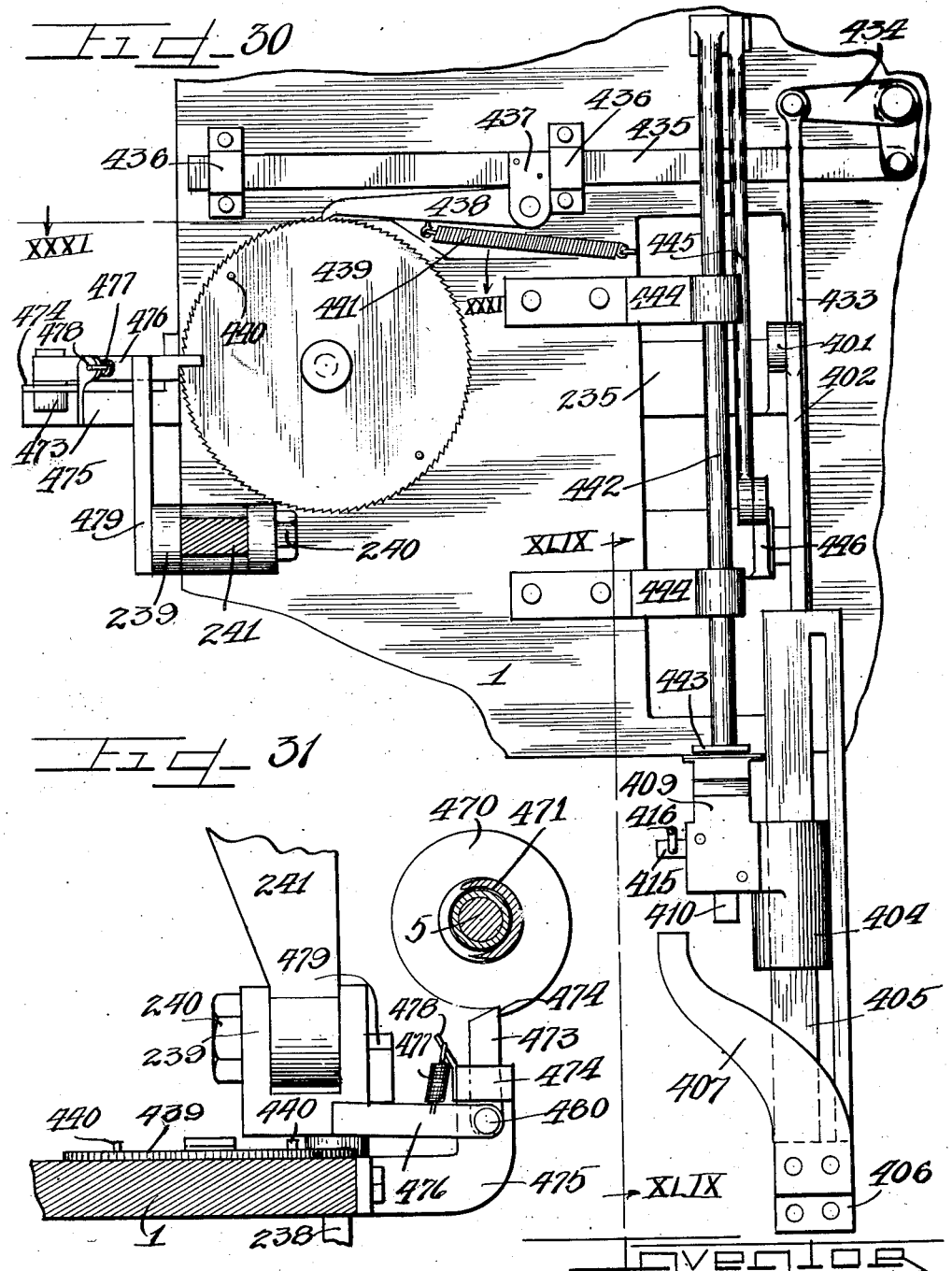

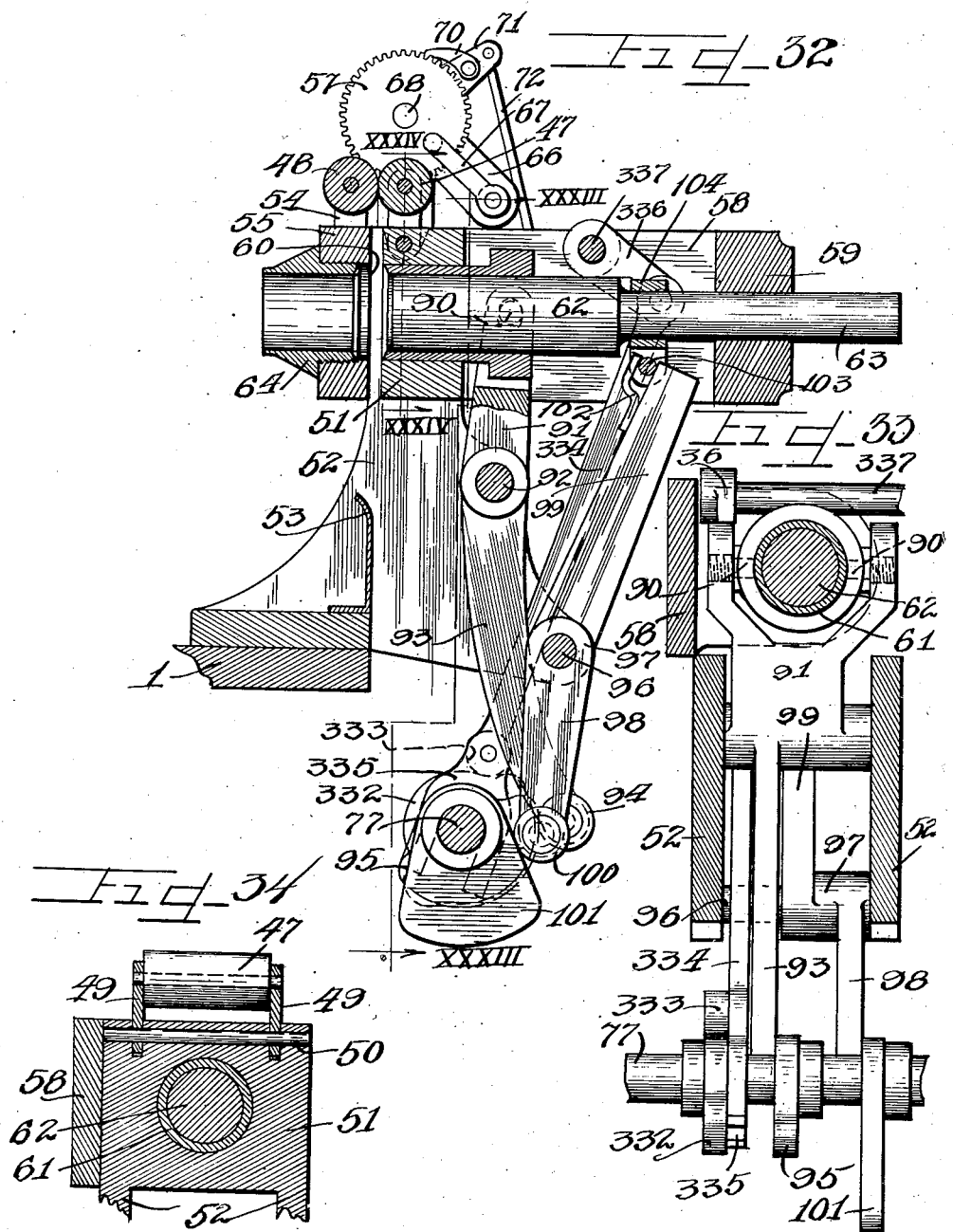

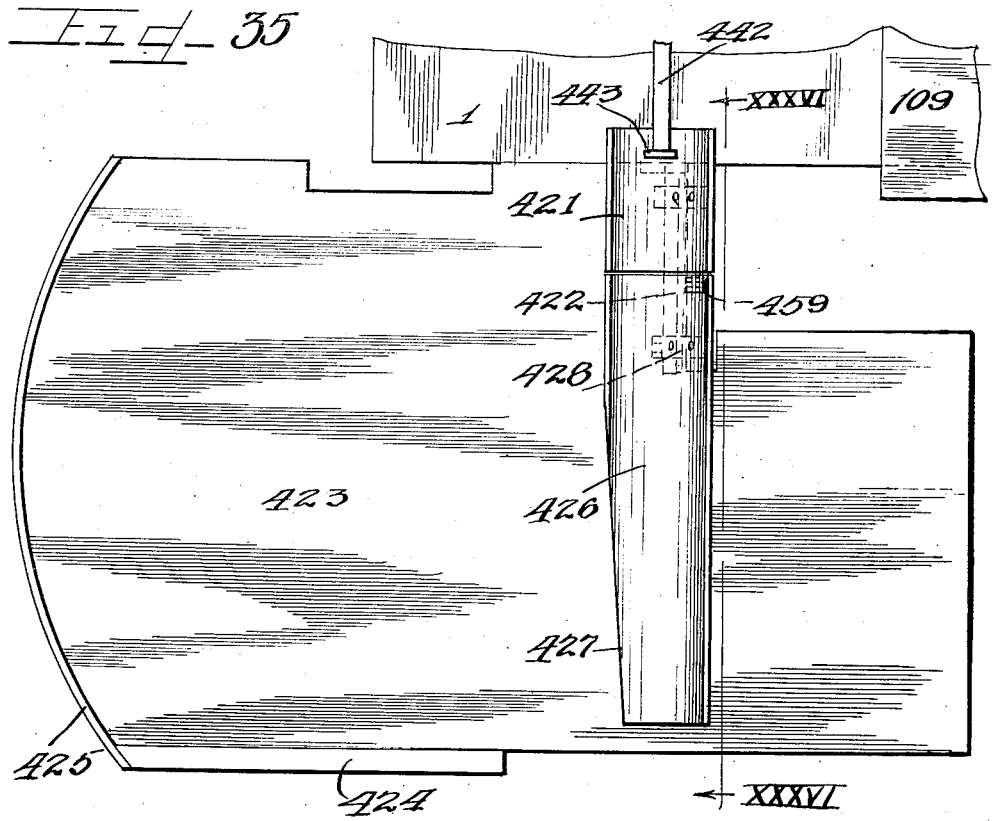
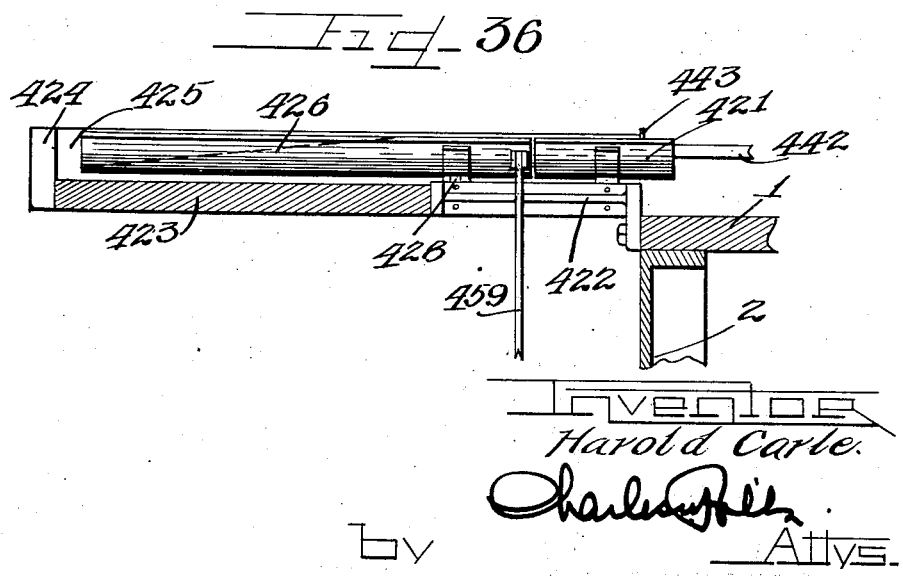

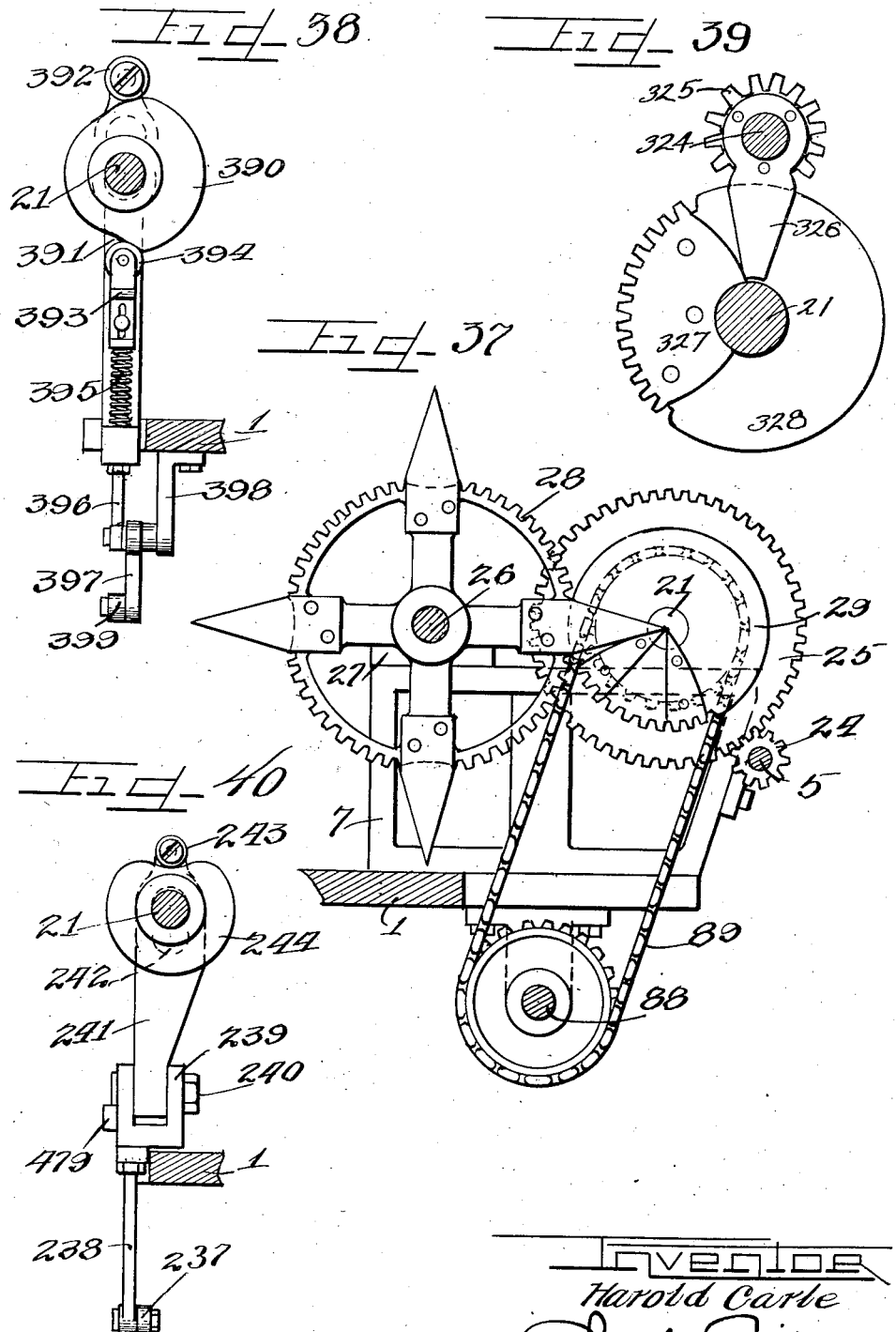

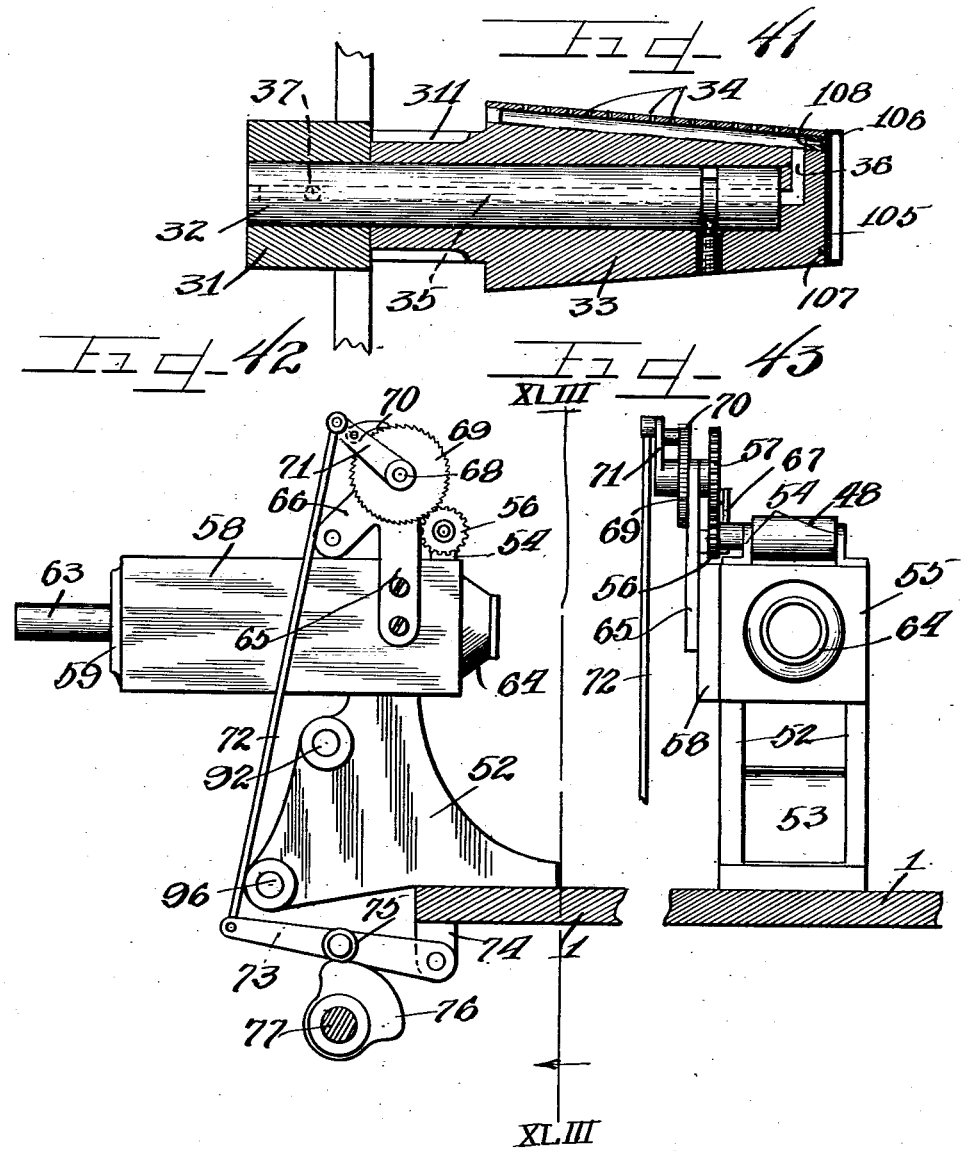

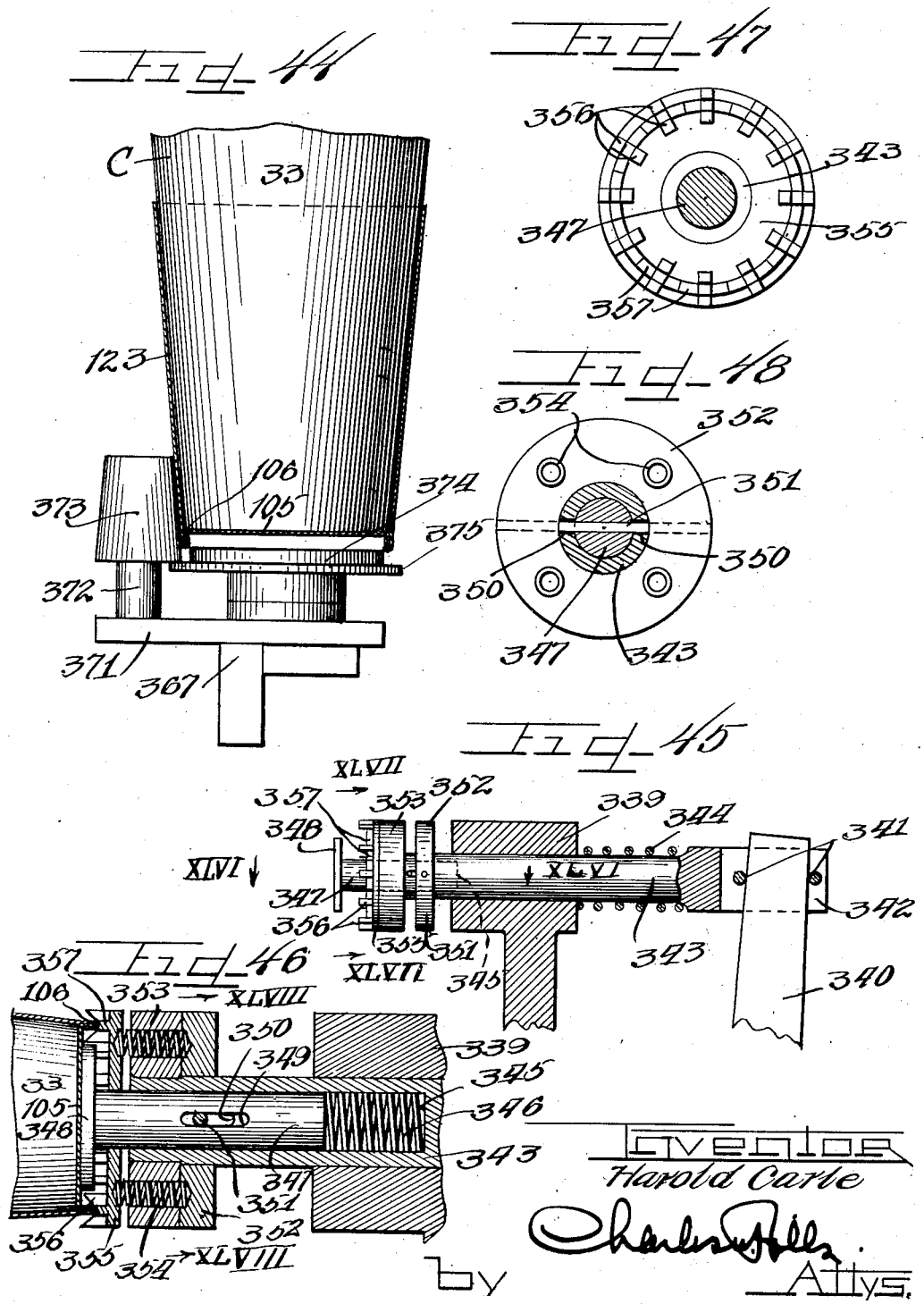

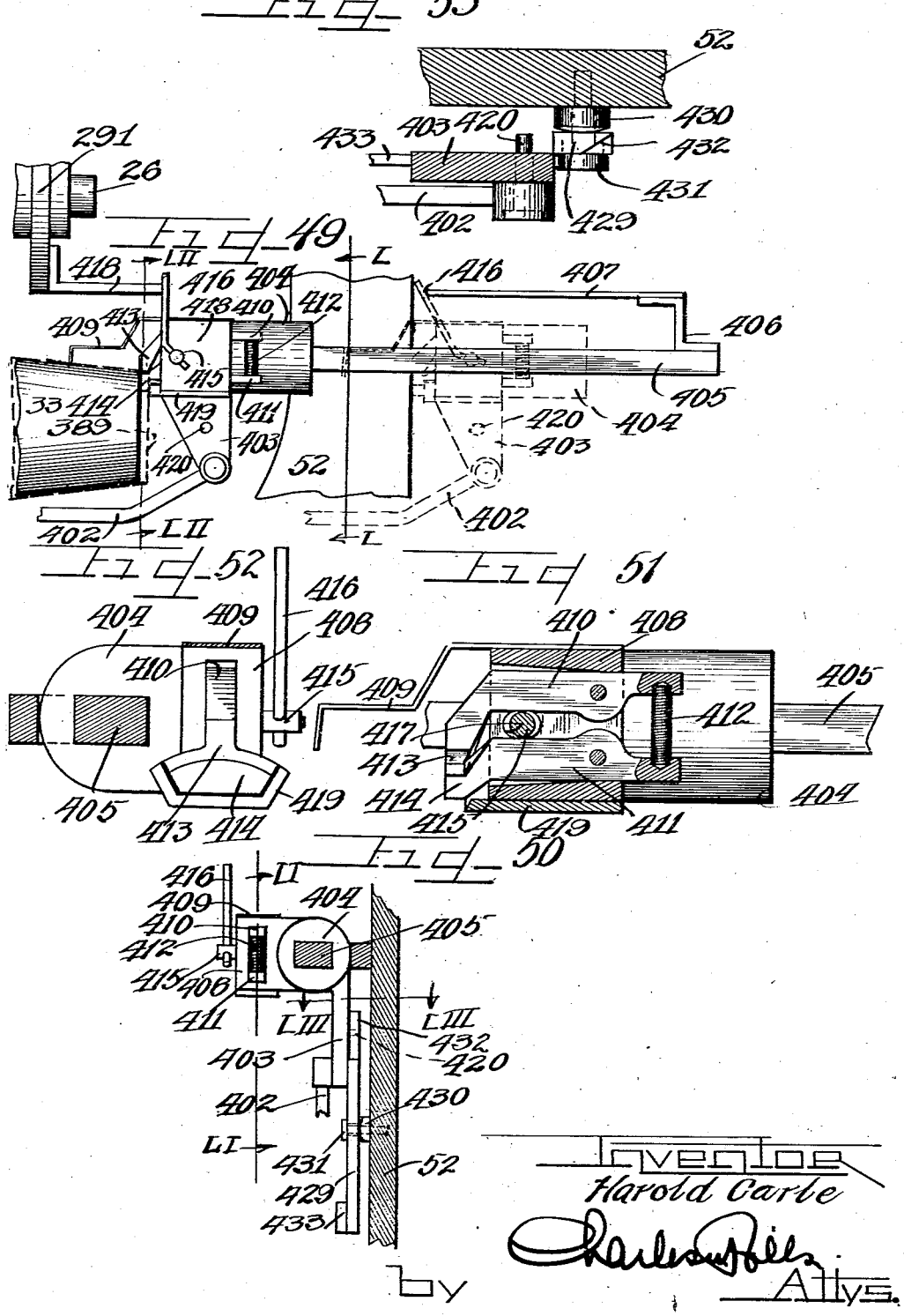

Patented Jan. 14, 1930

1,743,424

UNITED STATES PATENT OFFICE

HAROLD CARLE, OF BUFFALO, NEW YORK, ASSIGNOR, BY MESNE ASSIGNMENTS, TO THE VORTEX MFG. CO., OF CHICAGO, ILLINOIS, A CORPORATION OF DELAWARE

FLAT-BOTTOM CUP-MAKING MACHINE

Application filed October 18, 1926. Serial No. 142,370.

This invention relates to a cup making machine and more particularly to an improved machine for automatically producing flat bottomed paper cups from a plurality of properly shaped blanks fed into the machine.

It is an object of this invention to provide a rotary type of a flat bottomed cup making machine adapted to produce, stack and count large quantities of flat bottomed paper cups.

It is also an object of the invention to provide a power driven machine adapted to automatically assemble, form and glue a plurality of blanks to one another to form a liquid-tight flat-bottomed cup adapted to stand independently of a holder.

Another object of the invention is to provide a machine adapted to apply glue to a body blank, punch out a bottom blank and then form the body blank around the bottom blank, pressing a flange of the bottom blank between a glued bent over margin of the body blank to produce a completed flat bottomed cup which is counted and automatically discharged from the machine.

It is a further object of this invention to provide a machine having pneumatic means for transfering a body blank from a magazine to a gluing mechanism and then to a pneumatic former to be formed around a bottom member to enclose the same to produce a completed flat bottomed cup which is gripped and pulled from the former and then nested with previously formed cups before being discharged from the machine when the group of nested cups reaches a predetermined number.

It is furthermore an object of this invention to provide a machine having a mechanism for punching feeding and holding a bottom blank against a former while a body blank is supplied with glue and then formed around the former and crimped and glued to said bottom blank to form a completed flat bottomed cup which is counted and deposited in a group of previously stacked cups and then automatically discharged with the group when a predetermined number of such cups have been produced.

Still another object of the invention is providing a machine wherein a rotatable spider carries a plurality of rotatable apertured formers, each of which is adapted when in an initial position to have a plurality of blanks fed thereto and then consecutively carried thereby through other positions wherein one of the blanks is formed around and pressed against another to produce a liquid-tight flat bottomed cup which in the final position of the former is automatically released and deposited in a stack of previously formed cups to be discharged from the machine when the stack reaches a predetermined number.

It is also an object of the present invention to provide a machine having means for applying adhesive to one blank while another blank is first punched and fed to a former to be carried thereby as the adhesived blank is formed therearound and glued to itself after which another adhesived portion of said adhesived blank is formed around and pressed against a bent over margin of the punched blank to form a completed flat bottomed cup adapted to be gripped and pulled from the former and then pushed into nested relation with previously formed nested cups to be discharged therewith when the stack reaches a predetermined number.

It is an important object of this invention to provide a paper cup making machine of the rotary type having pneumatic mechanisms for gripping and transferring cup blanks through a series of different stations to permit the blanks to be properly associated and formed by degrees into flat bottomed cups properly glued to form self supporting water-tight containers adapted to be counted, stacked and then automatically discharged from the machine in stacked groups of predetermined numbers.

Other and further important objects of this invention will be apparent from the disclosures in the specification and the accompanying drawings.

This invention (in a preferred form) is illustrated in the drawings and hereinafter more fully described.

On the drawings:—

Figure 1 is a fragmentary top plan view of a flat bottomed cup forming machine embodying the principles of this invention but omitting the blank feed mechanisms and the cup discharge and stacking mechanisms.

Figure 2 is a fragmentary top plan view of another portion of the machine, illustrating the body blank feed mechanisms.

Figure 3 is a front elevation of the machine, with parts omitted, and showing the bottom blank punching mechanisms and the cup discharge mechanisms.

Figure 4 is a left side elevation of the machine, with parts omitted.

Figure 5 is a right side elevation of the machine, with parts omitted.

Figure 6 is a fragmentary horizontal sectional view, beneath the machine table, taken on line VI—VI of Figure 3.

Figure 7 is an enlarged front end elevation taken on line VII—VII of Figure 1, with parts in section and with parts omitted.

Figure 8 is a fragmentary vertical detail section, with parts omitted, taken on line VIII—VIII of Figure 3, illustrating the turret head and adjacent parts.

Figure 9 is an enlarged fragmentary detail view of the rear end of the turret head, taken on line IX—IX of Figure 1.

Figure 10 is a fragmentary horizontal detail section of the turret head, taken on line X—X of Figure 7.

Figure 11 is a vertical front view of the body blank magazine and feed mechanism, taken on line XI—XI of Figure 2.

Figure 12 is an enlarged vertical detail sectional view of the cup bottom presser mechanisms taken on line XII—XII of Figure 1.

Figure 13 is a fragmentary detail taken on line XIII—XIII of Figure 11, illustrating the cam mechanism which controls the pneumatic operating means of the body blank transfer arm.

Figure 14 is a vertical detail view taken on line XIV—XIV of Figure 6, illustrating the cam mechanism which governs the swinging operation of the body blank transfer arm.

Figure 15 is a vertical detail view taken on line XV—XV of Figure 1 and showing the cam mechanisms which governs the swinging operation of the body blank feed arm and the operation of the pneumatic controls forming a part thereof.

Figure 16 is a vertical detail view taken on line XVI—XVI of Figure 6, showing the gear mechanisms which control the lowering of the body blank magazine.

Figure 17 is an enlarged top plan view of the body blank carrying magazine, with the blanks removed.

Figure 18 is a side elevation of the body plank carrying magazine taken on line XVIII—XVIII of Figure 2.

Figure 19 is a fragmentary detail section taken on line XIX—XIX of Figure 17.

Figure 20 is an enlarged fragmentary detail section taken on line XX—XX of Figure 6.

Figure 21 is an enlarged detail section of the body blank transfer mechanisms, taken on line XXI—XXI of Figure 2.

Figure 22 is a fragmentary detail plan view of the transfer mechanism, taken on line XXII—XXII of Figure 21.

Figure 23 is an enlarged elevation of the upper portion of the blank transfer control mechanism, taken on line XXIII—XXIII of Figure 11.

Figure 24 is an enlarged top plan view of the body blank adhesive applying pad and tank.

Figure 25 is a vertical detail section of the glue tank taken on line XXV—XXV of Figure 24.

Figure 26 is an enlarged top plan view of the glued blank feed mechanisms.

Figure 27 is a longitudinal detail section taken on line XXVII—XXVII of Figure 26.

Figure 28 is an enlarged detail view taken on line XXVIII—XXVIII of Figure 27.

Figure 29 is an enlarged detail view taken on line XXIX—XXIX of Figure 27.

Figure 30 is an enlarged plan view of the cup counter and the counter actuating mechanism taken on line XXX—XXX of Figure 4.

Figure 31 is a fragmentary detailed sectional view of the counting mechanism taken on line XXXI—XXXI of Figure 30.

Figure 32 is a vertical detail section, with parts in elevation, of the bottom blank feed and punch mechanisms taken on line XXXII—XXXII of Figure 2.

Figure 33 is a vertical detail taken on line XXXIII—XXXIII of Figure 32.

Figure 34 is a fragmentary detail section of the punch mechanism and material feed roller taken on line XXXIV—XXXIV of Figure 32.

Figure 35 is a plan view of the cup discharge chutes and table taken on line XXXV—XXXV of Figure 3.

Figure 36 is a section of the discharge table taken on line XXXVI—XXXVI of Figure 35.

Figure 37 is an enlarged fragmentary elevational view of a portion of the driving mechanism taken on line XXXVII—XXXVII of Figure 4.

Figure 38 is a fragmentary detail section of the cup discharge or pusher controlling mechanism taken on line XXXVIII—XXXVIII of Figure 4.

Figure 39 is a detail sectional view on line XXXIX—XXXIX of Figure 4 showing the Geneva-gear mechanism controlling the rotation of the cup mandrels in the second and third stages of the formation of a cup.

Figure 40 is a fragmentary detail section taken on line XL—XL of Figure 4, showing the glue pad controlling cam mechanism.

Figure 41 is a longitudinal detail section, with parts in elevation, taken on line XLI—XLI of Figure 7, illustrating the construction of the cup forming mandrels.

Figure 42 is a vertical detail view of the bottom blank feed and punching mechanisms taken on line XLII—XLII of Figure 3.

Figure 43 is a front elevation of the bottom blank feed and punch mechanisms taken on line XLIII—XLIII of Figure 42.

Figure 44 is an enlarged fragmentary detail view taken in position C of a mandrel on line XLIV—XLIV of Figure 7 showing a cup in section ready for a finishing operation.

Figure 45 is an enlarged detail section, with parts in elevation, taken on line XLV—XLV of Figure 2, showing the cup bottom crimping mechanism.

Figure 46 is an enlarged fragmentary detail section of cup bottom forming mechanisms taken on line XLVI—XLVI of Figure 45, illustrating the operation.

Figure 47 is an enlarged transverse detail section taken on line XLVII—XLVII of Figure 45.

Figure 48 is a transverse detail section taken on line XLVIII—XLVIII of Figure 46.

Figure 49 is a detail side elevation of the cup discharge mechanism taken on line XLIX—XLIX of Figure 30, illustrating the operation in dotted lines.

Figure 50 is a transverse detail section taken on line L—L of Figure 49.

Figure 51 is an enlarged detail section taken on line LI—LI of Figure 50.

Figure 52 is a transverse detail section taken on line LII—LII of Figure 49.

Figure 53 is an enlarged fragmentary detail section taken on line LIII—LIII of Figure 50.

As shown on the drawings:

The improved rotary flat bottomed cup making machine embodying the present invention embraces mechanisms adapted to feed a strip of material to a cup bottom blank punch device and deliver the punched out flanged bottom blank against one flat end of a frustum shaped forming mandrel; to remove a sector-shaped body blank from a magazine and automatically apply adhesive thereto before feeding the body blank into position to be engaged by the mandrel and carried thereby into a position to be shaped therearound and around the flanged bottom blank; to carry the partly formed cup blanks into another position wherein mechanisms act in timed relation to cause an adhesived margin of the cup body blank to be bent around the flange of the bottom blank and be pressed thereagainst to hold the bottom blank securely gripped by the body blank to form a completed flat bottomed cup; to effect a conveyance of the formed cup by the mandrel into a final position wherein the cup is released and gripped by a gripper which pulls the completed cup off of the mandrel and permits the cup to drop into the path of a reciprocating stacker adapted to push the released cup onto a pivoted chute and into nested relation with previously formed flat bottomed cups to be automatically counted and then discharged with a group of nested cups when a predetermined number of said cups have been produced and delivered into said chute.

With the above briefly mentioned operations in mind, the improved machine consists generally of a plurality of associated devices which are supported upon a metal framework comprising a table or platform 1 supported by legs 2 which are braced by cross pieces or braces 3. Disposed longitudinally below the table 1 and supported on the braces 3 is an air exhaust tank 4 (Figure 3) the purpose of which is hereinafter more fully described.

It will be conducive to a clear understanding of the operation of the machine to describe at this point the character and arrangement of the main driving mechanism. A horizontal drive shaft 5 is journalled in suitable bearings 6 held by brackets 7 mounted on the table 1 and is rotated through a clutch 8 operated by a conveniently disposed hand lever 9 and a shiftable rod or shaft 10 on which a crank arm 11 is carried to connect up with said clutch 8 (Figure 4). Mounted on the shaft 5 for co-action with the clutch 8 is a large driving gear 12 which meshes with a driving pinion 13 mounted on one end of the shaft 14 of a driving motor 15. The motor 15 is supported on a bracket 16 secured to the rear side of the machine framework (Figure 1). A hand wheel 17 is secured near the forward end of the main shaft 5. Mounted on the rear end of the main shaft 5 is a sprocket around which an endless chain 18 is trained. The chain 18 is connected to drive a rotary exhaust pump 19 which is connected by means of a pipe 20 to the air exhaust tank 4.

An auxiliary horizontal cam shaft 21 is journalled in bearings 22 on the brackets 7 and in a bearing bracket 23 mounted on the table 1. A pinion 24 on the shaft 5 is in mesh with a large gear 25 on the shaft 21 thereby causing the shaft 21 to be continuously rotated.

A horizontal central shaft 26 mounted in bearings 27 is intermittently rotated by the cam shaft 21 by means of Geneva gears 28 and 29. During the rotation of the main shaft 5 continuous rotation will be imparted to the cam shaft 21 and to the shaft of the pump 19, while the central shaft 26 is intermittently rotated from the cam shaft 21.

The various operations of forming flat bottomed cups are focussed about a spider or turret head 30 which is keyed to the central shaft 26 for intermittent rotation therewith. The turret head 30 has integrally formed thereon four radially directed arms or spokes 31. Each of the arms 31 is provided with a bearing stud 32 projecting therefrom at right angles and carries a rotatable frustum-shaped cup former or mandrel 33. Each mandrel 33 is provided with a plurality of pneumatic gripper apertures or openings 34 disposed in a longitudinal row. As illustrated in Figures 9 and 41 each of the mandrel studs 32 is provided with a longitudinal air passage 35 one end of which communicates with an air passage 36 leading up to the gripping apertures 34. The other end of each air passage 35 connects up with one end of an air channel or passage 37 formed in an arm or spoke 31. Each of the arm passages 37 terminates in the back face of the turret head 30. A vacuum plate 38 is loosely mounted on the shaft 26 against the back face of the turret head 30 and has an arc shaped air groove 39 in one face thereof adapted to register with the turret head ends of the air passages 37 (Figure 9). A flexible tube or pipe 40 leads from the air groove 39 in the vacuum plate 38 to the air exhaust tank 4. A hole 41 is drilled through the vacuum plate 38 and is adapted to register with one of the passages 37 in the turret head 30 when the vacuum plate 38 is in a certain position of adjustment. Direct communication will obviously be allowed at all times between the pneumatic gripper openings 34 in each former 33 and the apertures 37 in the turret head 30 and the turret arms 31. The frustum-shaped formers or mandrels 33 are reduced in diameter at their outer ends and are adapted to support a flanged cup bottom blank at the reduced end and a cup body blank and are subject to rotation on their studs at predetermined times and to translation periodically from one position to another in a circular path, by reason of the rotation of central shaft 26.

The rotary formers or mandrels 33 carried by the rotating turret head 30—31 are adapted to assume the different positions designated, A, B, C, and D during the forming of flat bottomed cups, the first steps of which revolve themselves around the apparatus for feeding a strip of material, such as prepared paper, to a bottom blank punch mechanism clearly illustrated in Figures 3, 8, 32, 33, 34, 42 and 43.

The bottom blank feed and punch mechanisms comprise a supporting bracket 42 mounted on the side of a plate 58. The bracket 42 removably supports a rotatable reel 43 carrying a roll of prepared paper ribbon 44 having a strap spring 45 frictionally engaged therewith to retard the rotation thereof. The spring 45 is supported on an arm 46 forming a part of the bracket 42. The strip of paper 44 is conducted downwardly from the reel and passes between two feed rollers 47 and 48. The roller 47 as illustrated in Figure 34, is rotatably supported between a pair of bracket arms 49 which are pivoted on a stub shaft 50 projecting through a male punch block 51. The punch block 51 is supported on the table 1 by means of a pair of bracket plates 52, between which a paper guide shield 53 is mounted. The second roller 48 has its shaft journalled in brackets 54 mounted on a die block 55. A small gear 56 is fixed on one projecting end of the shaft for the roller 48, and meshing with said small gear 56 is a larger gear 57. A side plate 58 rigidly secured to one side of the punch block 51 supports the die block 55 and a punch rod guide block 59. A space 60 (Figure 32) is provided between the die block 55 and the punch block 51 to permit the strip of paper 44 after passing between the rollers 47 and 48 to pass downwardly through the field of operation of a bottom blank punch 61 and a forming punch 62. The punch 61 is slidably mounted within the punch block 51 and has a cutting edge formed on the punching end thereof. The forming punch 62 is concentric with the punch 61 and has a punch stem 63 integrally formed thereon and slidable through an opening in the guide block 59. Adjustably mounted in the die block 55 is a forming die block 64 through which the formed cup bottoms are adapted to be projected.

The mechanism for rotating the feed rollers 47 and 48 is illustrated in Figures 42 and 43 and comprises an upright arm 65 having an inclined arm 66 formed thereon. Supported on one side of the inclined arm 66 is a friction brake 67 carrying a shoe which is held in frictional engagement with one side of the gear 57. The gear 57 is fixed on one end of a stub shaft 68 journalled in the bracket arm 65. Also mounted on the shaft 68 is a ratchet wheel 69 with which a pawl 70 coacts. The pawl 70 is mounted on a crank arm 71 secured on one end of the stub shaft 68. Pivotally connected to the outer end of the crank arm 71 is the upper end of a connecting rod 72 the lower end of which is pivoted on one end of a lever arm 73. The other end of the arm 73 is pivoted on a bracket 74 secured to the under side of the table 1. A roller 75 is carried on one side of the lever arm 73 and rides on a control cam 76 secured on a transverse cam shaft 77 journalled in bearing brackets 78 secured to the front side of the machine supporting front legs 2 beneath the table 1.

The strip of paper ribbon after having bottom blanks punched therefrom is designated by the reference numeral 79 (Figure 3) and is permitted to pass downwardly behind the shield 53 and beneath the table 1 to be wound upon a reel 80 removably supported on a shaft journalled in depending brackets 81. The brackets 81 are secured to a brace bar 82, the ends of which are secured to the two front legs 2. A pulley wheel 83 is fixed on one end of the shaft supported by the brackets 81 and trained around the pulley wheel 83 is an endless belt 84 which is also trained around a grooved pulley 85 fixed on the shaft 77 to receive a drive therefrom.

The cam shaft 77 carries a bevel gear 86 which meshes with a bevel gear 87 fixed on the front end of a longitudinally disposed cam shaft 88. The shaft 88 is driven by an endless chain 89 which is trained around sprocket wheels carried by the shafts 88 and 21 (Figure 37).

Referring now to the detail Figures 32 and 33, the mechanisms for operating punch 61 and the forming punch 62 will be described. The punch 61 is provided with an integral collar carrying diametrically opposite pins 90, the projecting ends of which are engaged in openings provided in the arms of a yoke member 91 which in turn is pivoted on a shaft 92 supported in the bracket plates 52. Integral with the yoke member 91 is a downwardly directed arm 93 on the lower end of which a roller 94 is rotatably supported to roll on the periphery of a punch control cam 95 fixed on the cam shaft 77. Also supported by the plates 52 is a lower stub shaft 96 for rotatably supporting a bell crank sleeve 97 having bell crank arms 98 and 99 integrally formed thereon. A roller 100 is rotatably carried on the lower end of the short bell crank arm 98 and has rolling contact with the periphery of a forming punch control cam 101 secured on the cam shaft 77. Fastened to the upper end of the upper bell crank arm 99 is a bent finger 102 which co-acts with a pin 103 carried by a collar 104 fixed on the forming punch guide stem 63. The forming punch 62 is thus adapted to be actuated to force the punched out bottom blank 105 (Figure 41) through the forming die block 64 thereby causing the margin of the bottom blank to be bent over to form a flange 106. The flanged cup bottom blank 105 is pushed by the forming punch into engagement with the flat outer end of the mandrel 33 in position A. The outer end surface of each mandrel 33 is provided with an air exhaust groove 107 which is connected by a passage 108 to the air passage 36 of the mandrel, so that when a cup bottom blank 105 is forced against the end of the mandrel, the air suction acts to hold the cup bottom blank 105 in place as the forming punch 62 is retracted.

Having described the punching out, forming and positioning of a cup bottom blank, the apparatus for supporting, feeding and gluing a cup body blank will now be described.

Rigidly secured to the front right hand corner of the table 1 is an extension board or auxiliary table 109. Positioned adjacent the front edge of the auxiliary table 109 is a magazine supporting post or sleeve 110 having an integral arm 111 which is rigidly secured to the upper surface of said auxiliary table 109. Mounted upon the upper end of the sleeve 110 is a flat plate or head 112 to which a magazine base plate 113 is rigidly fastened. Secured upon the top of the base plate 113 are a plurality of stationary guide arms 114 and a pair of adjustable guide arms 115 which are adjustable in guide slots 116 provided in the base plate 113. Also mounted upon one corner of the base plate 113 is a stop arm 117 which is slightly higher than the guide arms 114 and 115 and carries an adjustable stop screw 118. The screw 118 serves as a stop to limit the swing of a cup blank transfer frame 208 hereinafter described. The magazine base plate 113 is provided with an opening 119. Each of the blank guide arms 114 and 115 is provided with a smooth liner plate 120 fastened at the lower end to the respective guide arms and having the upper end free to be adjusted by means of a screw 121. The liner plates 120 serve to control the upward movement of the blank supporting plate 122 by the frictional engagement between the stack of blanks and said liner plates 120 the upper ends of which are deflected by the screws 121.

Positioned above the magazine base plate 113 is a movable false bottom or cup blank supporting plate 122 shaped as illustrated in Figure 17 to slide upwardly and downwardly between the guide arms 114 and 115. The false bottom is adapted to carry a stack of cup body blanks 123 which are of segment shape as illustrated in Figure 2. The blank carrier plate 122 is secured upon the upper end of a post or rod 124. A pin 125 (Figure 11) projects from the post 124 and slides in a longitudinal slot 126 provided in the sleeve 110. The post 124 is slidable through the sleeve 110 and passes upwardly through the opening 119 in the base plate 113. Connected to the lower end of the post 124 is one end of a control spring 127 the upper end of which is secured to the bottom of the auxiliary table 109 and normally acts to raise the blank carrier plate 122 and the stack of cup blanks carried thereby to permit the uppermost cup body blank in the stack to be delivered against a blank transfer mechanism hereinafter described.

Secured around the post 124 is a collar or sleeve 128 having a slot in one side thereof to permit an eccentric disk 129 to co-act with the post at predetermined times to pull the same downwardly against the action of the spring 127. The disk 129 is supported on a stub shaft 130 carried by a pair of brackets 131 fixed on the sleeve 128. Fixed on one end of the stub shaft 130 is a crank arm 132 to which is pivotally connected one end of a connecting link 133. The other end of the link 133 is pivoted to a toggle arm 134 which slidably projects through a slot 135 (Figure 5) formed in a guide bracket 136 secured to the auxiliary table 109. A pin 137 projects through the slot 135 and serves as a fulcrum for the free end of said toggle arm 134. The second end of the toggle arm 134 is pivoted to one end of a crank arm 138 the other end of which is fixed on one end of a shaft 139 journalled in bearing brackets 140 and 141 supported by the auxiliary table 109. Secured on the shaft 139 adjacent the bearing bracket 141 is a crank arm 142 (Figure 6) which is pivoted to one end of a connecting rod 143 having a turnbuckle 144 intermediate the ends thereof to permit adjustment of the connecting rod. The other end of the connecting rod 143 is pivoted to a crank arm 145 secured on a shaft 146 journalled in a bearing bracket 147 supported beneath the table 1. A Geneva gear 148 is fixed on the shaft 146 (Figure 16) and co-acts with a Geneva gear 149 fixed on the cam shaft 88 to receive a drive therefrom.

From the cup body blank carrying magazine the body blanks 123 are adapted to be removed one at a time from the top of the stack. This operation is performed automatically at predetermined times by means of a blank transfer mechanism comprising a control cam 150 fixed on the cam shaft 88 and co-acting with a roller 151 (Figures 6 and 14) carried on one end of yoke bar 152. The yoke bar 152 is provided with a slot 153 through which the cam shaft 88 projects. The other end of the yoke bar 152 is pivotally connected to a yoked member 154 having telescoping engagement with a second yoked member 155. The two yoked telescoping members 154 and 155 are connected by a cushioning spring 156 positioned between the yoked heads of said members. The head of the yoked member 155 is pivoted to a lower bell crank arm 157 fixed on the lower end of a bell crank sleeve 158 which is mounted on a vertical shaft 159 fastened to one corner of the table 1. An upper bell crank arm 160 is integrally formed on the upper end of the sleeve 158 and has one end of a long connecting rod 161 pivoted thereon. The other end of the connecting rod 161 is pivoted to a crank arm 162 (Figure 6) having one end thereof pinned to the lower end of a tubular vertical shaft 163 (Figure 21) which projects upwardly through a supporting sleeve 164 provided with an integral bracket 165ª rigidly secured to the auxiliary table 109. Seated upon the upper end of the supporting sleeve 164 and engaged around the shaft 163 is a collar 165 having an air outlet passage 166 therein into which one end of an air exhaust pipe 167 projects. An air control valve 168 is provided in the pipe 167 and has a valve control lever 169 forming a part thereof. Connected to operate the valve control lever 169 is one end of a link 170 the other end of which is pivoted to the upper end of a slide plate 171. The plate 171 is slidably mounted in a guide groove provided in a guide bracket or extension 172 formed on one side of the supporting sleeve 164. Attached to the slide plate 171 is the upper deflected end of a slotted connecting bar 173 the lower end of which carries a roller 174. The roller 174 co-acts with the periphery of a control cam 175 fixed on the cam shaft 77. The air pipe 167 projects through the table 1 and connects up with a main control valve 176 mounted in an air main 177 leading to the air exhaust tank 4. A valve stem 178 is connected with the valve 176 to permit manual control thereof.

Rotatably engaged around the shaft 163 above the collar 165 is a flanged sleeve 179 having an air groove 180 formed in the bottom face thereof. The groove 180 communicates with the air outlet passage 166 (Figure 21). Also communicating with the groove 180 is one end of an auxiliary air exhaust pipe 181 which projects upwardly through an opening 182 provided in an arm 183 integrally formed on the upper end of the hollow shaft 163. A spring 184 is coiled around the upper end of the sleeve 179 and seats against a washer 185 on the shaft 163 beneath the arm 183. The auxiliary air exhaust pipe 181 also connects up with an opening in an apertured plate 186 supported on a cup blank transfer yoke or frame 208 fixed on the end of the arm 183. Hinged to one projecting margin or edge of the plate 186 (Figure 11) is a hollow cup blank transfer block or hollow bar 187 shaped substantially the same as the plate 186 and having a plurality of apertures 188 in the bottom face thereof. The blank transfer block 187 is also provided with an air exhaust opening 189 in the top wall thereof adapted to register with the end of the auxiliary air exhaust pipe 181 when the block 187 is in closed position contacting the supporting plate 186 as illustrated in Figure 21. Secured to the blank transfer block 187 is one end of a handle rod 190 which is journalled in a depending end of a bracket 191 secured upon the arm 183. A spring 197 is engaged around the rod 190 between the bracket 191 and a sleeve 192 and normally acts to hold the block 187 in contact with the plate 186. For the purpose of moving the blank transfer mechanism from the magazine into a position over the glue tank 209, a coiled spring 160ª is connected to the bell-crank arm 160 and the table 1.

Fixed on the end of the handle rod 190 is the sleeve 192 having a cam arm 193 integrally formed thereon. Co-acting with the cam arm 193 is a pin 194 carried on one end of an arm 195 secured on the upper end of a rod or stem 196 which is slidably mounted within the shaft 163. The lower end of the stem 196 projects from the shaft 163 and seats against a shoulder 198 formed on the end of a crank arm 199. The crank arm 199 is fixed on a shaft 200 journalled in a bearing bracket 201 secured to the auxiliary table 109 and on a bearing supported on one of the front legs 2 of the machine. Mounted on one side of the crank arm 199 is a flanged roller 202 which rides on the periphery of a control cam 203 carried on the cam shaft 77. As illustrated in Figure 23 the sleeve 179 carries a pin 204 which projects into a slot 205 formed in a bracket plate 206 integrally formed on an apertured disk 207 secured upon the top of the arm 183. With this arrangement the sleeve 179 will rotate with the arm 183 and the shaft 163.

The apparatus just described is for the purpose of gripping the uppermost body blank in the blank holding magazine and transferring the removed blank into a position over an adhesive applying mechanism which will now be described. The removal blank is held by the gripper block 187 and beneath the transfer frame 208 over the adhesive applying mechanisms as illustrated in Figure 2.

The adhesive applying mechanisms comprise an adhesive or glue supply tank 209 having a plunger pot 210 integrally formed on the bottom thereof and communicating with the interior of said tank through an opening 211. The glue tank plunger pot 210 is provided with base flanges 212 which are rigidly secured to the auxiliary table top 109. Secured in the glue pot 210 are a pair of guide posts 213 which project upwardly into the tank 209 as illustrated in Figures 24 and 25. Slidably engaged on the posts 213 is a double cylinder plunger 214 having a plate 215 secured or formed on the upper end thereof within the tank 209. Formed on two edges of the plate 215 is a straight adhesive applying pad 216 and a curved pad 217. Pivoted to the lower end of the plunger 214 is the lower end of a link 218 the upper end of which is pivoted to the inner angled end of lever 219. The lever 219 is fulcrumed intermediate its end on a pin 220 supported in bearing lugs 221 formed on the upper edge of the tank 209. Pivoted to the outer portion of the lever 219 and operable thereby is the upper end of a connecting rod 222 the lower end of which is pivoted to one end of a control bar 223. The bar 223 is integrally formed on a sleeve 224 loose on a shaft 225 supported in bearing brackets 226 and 227 mounted on the auxiliary table 109 and the table 1 respectively. The outer or forward end of the control bar 223 is notched Fig. 5 to co-act with the end of stop bracket 228 to limit a rebound upward movement of the adhesive applying pad 216-217 after the bar 223 has first been actuated as hereinafter described. The stop bracket 228 is fixed on the under side of the auxiliary table 109.

Also pivotally connected to the lever 219 is the upper end of a telescoping connecting member 229 having a coiled spring 230 covering and connecting the telescoping parts. The lower end of the telescoping member 229 is pivoted to one end of a lever 231 the other end of which is rotatable on the shaft 225 adjacent the sleeve 224. Rigidly secured on the shaft 225 adjacent the lever 231 is a crank arm 232. The free end of the crank arm 232 is provided with a pair of lugs 233 carrying adjustable set screws 234 which contact the side edges of the lever 231 to permit adjustment of the adhesive pad operating mechanisms. The spring connected telescoping member 229 serves to cause the adhesive pad to be operated against a blank with a resilient or cushioning action.

The shaft 225 projects through a sleeve 235 positioned between the bearing bracket 227 and a bearing bracket 236 secured to the table 1 (Figure 16). Fixed on the end of the shaft 225 to the outside of the bearing bracket 227 is a crank arm 237 to which the lower end of a rod 238 is pivotally connected. The upper end of the rod 238 projects above the edge of the table 1 and is secured to a channel yoke or union 239 which carries a pivot bolt 240 (Figure 40). Pivoted on the bolt 240 is the lower end of a bar or arm 241 having a slot 242 therein through which the cam shaft 21 projects. A roller 243 on the upper end of the arm 241 co-acts with the periphery of an adhesive pad control cam 244 fixed on the cam shaft 21.

After the adhesive applying mechanism has been actuated to apply a straight and a curved strip of adhesive to the under surface of the transferred body blank 123 held by the gripper block 187 in the position illustrated in Figure 2, the control cam 203 moves into the position shown in Figure 21 thereby permitting the stem 196 to drop by gravity causing the pin 194 to act on the cam arm 193 to swing the gripper block 187 downwardly away from the plate 186 to break or release the vacuum or suction action in the gripper block 187. The glued body blank is thus automatically released by the transfer mechanism and delivered to a cup body blank feed mechanism which will now be described.

The cup body blank feed mechanism comprises a blank receiving head or block 245 having a plurality of inter-connected passages 246 therein as illustrated in Figures 26 and 27. The top wall of the feed head 245 is provided with two rows of apertures 247. A curved slot 248 is provided in the blank feed head 245 for the purpose of receiving a blank centering lever not shown. An extension arm 249 is integrally formed on the feed head 245 and is secured to the outer end of a swinging arm 250 having a passaged supporting shank 251 formed on one end thereof provided with angled air passages 252 and 253 which open up through the top of said shank and through opposite sides thereof. A pipe 254 connects the side opening of the shank air passage 252 with a passage 255 in the outer end of the arm 250. The passage 255 communicates with one of the passages 246 in the blank feed head 245. Connected in the side opening of the passage 253 is one end of an elbow pipe 256 to the other end of which an air exhaust pipe or tube 257 is connected. The tube 257 passes downwardly through an opening in the table 1 and connects up with a pipe 258 (Figure 6) leading to a control valve 259 adapted to be operated manually by means of a valve stem or valve control rod 260. The control valve 259 connects up with the main air exhaust pipe 177 leading to the tank 4.

The shank 251 of the feed arm 250 has a hollow or passaged shaft 261 integrally formed thereon with said shaft projecting downwardly through a bearing sleeve 262 formed on a bracket 263 fixed on the top of the table 1. Secured rigidly to the lower projecting end of the hollow shaft 261 is a crank arm 264 having a threaded bolt extension 265 formed thereon. A yoked connector 266 is pivoted on the bolt extension 265 between retaining nuts 267 (Figure 1). Connected to the connector 266 is a connecting rod 268 the inner end of which is pivoted on the upper end of a fulcrumed bar 269 projecting through an opening 270 in the table 1 and supported on a bracket secured to the under surface of said table (Figure 15). A roller 271 is carried on the lower end of the fulcrumed bar 269 and has rolling contact with a feed arm control cam 272 secured on the cam shaft 88.

Rotatably seated upon the passaged shank 251 (Figures 26, 27 and 29) is an air exhaust control valve 273 having a diametric passage 274 therein connecting two arc shaped passages 275 and 276 in the lower face thereof co-acting respectively with the air passages 253 and 252 of the arm shank 251. Integrally formed on the valve 273 is a stem 277. The valve 273 is also provided with an air release port or aperture 278. The valve stem 277 projects downwardly through the hollow shaft 261 and has a crank arm 279 fixed on the lower end thereof. The crank arm is positioned to be actuated by a finger or lever 280 fixed on a stub shaft 281 journalled in bearings 282 rigidly fastened to one of the side edges of the table 1. Also fixed on the stub shaft 281 is a crank arm 283 to which one end of a connecting rod 284 is pivotally connected. Formed on the other end of the rod 284 is a yoke or forked member 285 which is slidably engaged over the shaft 88 (Figure 15). A roller 286 is carried by the rod 284 and co-acts with an air valve control cam 287 fixed on the shaft 88. A return spring 500 for the valve 273 and cam roller 286 is connected between the bracket 263 and an arm 501 formed on the hub of the crank arm 279 (Figs. 15 and 27).

As a glued up blank is released by the transfer block 187 the blank feed head 245 is positioned beneath the glued blank and the control valve 273 is so positioned that a suction action is produced in the feed head to cause the released blank to be pneumatically gripped by said feed head. At this stage in the making of a cup the feed arm 250 controlled by the cam 272 is swung from the position illustrated in Figure 2 inwardly toward the cup forming mandrel 33 in position A.

The blank feed head 245 is adapted to hold and carry the glued blank into the plane of the upper element of the conical frustum shaped mandrel at station A, which upper element of the mandrel contains a row of the pneumatic gripper openings 34. The advance end of the glued cup blank is now positioned over the row of apertures 34 and beneath a raised presser shoe 288 carried by an arm 289 pivoted to a spoke of a four arm sprocket wheel or spider 293. The sprocket wheel 293 is fixed on the shaft 26 and carries four pivoted arms 289, each of which carries a roller 290 which co-acts with the periphery of a common auxiliary presser shoe control cam 291. The cam 291 is rotatable on the central shaft 26 (Figures 7 and 10) and has one end of an eccentric arm 292 pivotally attached thereto. The eccentric arm 292 is secured to one end of a shiftable eccentric 294 having a slot 295 therein through which the shaft 21 projects. A cam follower or roller 296 is mounted on the shiftable eccentric 294 and co-acts with a main presser control cam 297 fixed on the shaft 21. The sprocket wheel 293 carries a plurality of head bolts 298 having control springs 299 engaged therearound and connected to the respective presser shoe arms 289 to resiliently hold the presser shoe arms in proper position.

At this stage in the formation of a cup the feed arm control valve 273 is operated to move the slots 275 and 276 out of register with the air passages 253 and 252 respectively to break off the connection with the air exhaust tank 4. When the valve 273 is operated, the inlet port 278 is moved into register with the passage 252 (Figures 26 and 27) thereby breaking the vacuum or suction action within the feed arm pipe 254 and the feed arm head 245. The cup blank on said head is thus released after it has been delivered into contact with the mandrel 33 in position A.

Referring now to Figures 9 and 10 the vacuum control valve plate 38 is adapted to be oscillated at this time by means of a shiftable eccentric arm 300 pivoted to a bracket 301 secured to the periphery of said valve plate 38. The arm 300 is provided with a slot 302 through which the cam shaft 21 projects. The arm 300 carries a roller 303 bearing against an air control valve cam 304 fixed on the cam shaft 21. At the position of the valve plate 38 in Figure 9 the air channel 39 is cut off from communication with the air passage 37 leading to the mandrel in position A, while the hole 41 registers with the passage 37 leading to the mandrel in position D. Upon movement of the arm 300 toward the left (looking at Figure 9) communication will be established between the air channel 39 and the passage 37 leading to the mandrel in position A, while communication between the hole 41 and the passage leading to the mandrel in position D will be broken. A suction action is thus produced in the mandrel in position A thereby causing the glued cup blank released by the blank feed head 245 to be pneumatically gripped or affixed by suction to said mandrel in an exact predetermined relation thereto.

At this point, with the mandrel 33 in position A having a formed cup bottom blank 105 and an adhesived cup body blank 123 affixed thereto, the turret head 30—31 is rotated from the shaft 21 through an arc of 90° by means of the Geneva gears 28 and 29 (Figure 37), thereby causing said blank to be carried ahead by the forming mandrel in its translatory movement toward position B.

At station B the coiling of the adhesived cup body blank 123 is effected in conjunction with a presser which cooperates along the upper element of the mandrel to its outer end to press the body blank firmly against the forming madrel. In the form disclosed the presser mechanism comprises a frustum shaped presser roll 305 having a shaft 306 journalled in a bearing bracket 307 fixed on a bracket arm 308. The bracket arm 308 is rigidly secured upon the top of the front framework bracket 7 and also affords a bearing for the shaft 26.

It will be understood that the forming mandrel 33 as it is carried by the turret head 30—31 from station A to station B, is locked against rotation by a latch pawl 309 carried on the end of a strap spring 310 one of which is secured to each of the spokes 31 of the turret head. Each latch pawl normally is held in locking engagement with the teeth of a gear 311 forming a part of the respective mandrel 33. When a mandrel moves into station B it is locked against rotation and devices are therefor provided to automatically operate to release the latch pawl at this station and to rotate the mandrel a plurality of times to complete the coiling or winding of the body blank beneath the pressed roller 307 and around the mandrel and the flanged cup bottom 105 carried thereby.

The mechanisms for releasing and rotating the mandrel at station B will now be described. As clearly illustrated in Figures 7 and 9, an oscillatable arm 312 is journaled on shaft 21 and is normally held in a raised or released position by a link 313 pivotally fastened at the lower end to a crank arm 314 fixed to a stub shaft 315 supported by a stationary bearing bracket 316 fixed upon the top of the front framework bracket 7. The shaft 315 is rocked by an arm 317 which carries a roller 318 tracking on the periphery of a control cam 319 on shaft 21. The arm 312 carries an extension rod or finger 320 to the end of which a roller 321 is attached. The upper end of the arm 312 carries a pinion 322 for co-action with the gear 311 of the mandrel at station B when said arm 312 is lowered. The arm 312 also supports stub shafts 323 and 324. The stub shaft 324 carries a mutilated gear 325 having a large cam tooth 326 secured to one side thereof (Figure 39) for co-action with a cam plate 327 fixed on one side of a mutilated gear 328 mounted on the shaft 21. The gears 325 and 328 with their co-acting plates form a Geneva gear mechanism. Sprockets 329 are attached one to each of the stub shafts 323 and 324 and trained around said sprockets is an endless chain 330 to transmit a drive from the shaft 324 to the shaft 323 at predetermined times. Also mounted on the stub shaft 323 is a large gear 331 which meshes with the smaller gear 322 to periodically rotate the same. The small gear 322 is rotatably supported on the outer end of the arm 312. A positive rocking of the arm 312 toward the mandrel in position B is permitted at predetermined times by the cam 319 and by the action of gravity on said arm.

Thus, when a mandrel 33 is moved into station B the control cam 319 is in a position to allow the arms 312 to drop by gravity into a position wherein the gear 322 meshes with the gear 311 of said mandrel and the roller 321 co-acts with the latch pawl 309 to push the same out of engagement with the gear 311 thereby unlocking said gears. At this point in the operation the mutilated gear 328 is timed to rotate the gear 325 and thus automatically to connect the mandrel with its rotating mechanism. The gear 322 acts to rotate the gear 311 and the mandrel at station B twice so that the body blank 123 is tightly coiled about the mandrel under the pressure of the presser roller 305 which also serves to press the glued straight margin of the body blank against another straight margin of the blank to form the body of the cup. The control cam 291 (Figure 7) is now positioned to permit the gripper show 288 to be moved by its control spring 299 into gripping engagement with the cup body blank to hold the same in proper position on the mandrel during the wrapping operation of the blank around the mandrel and around the flanged cup bottom carried thereby.

The cam 319 now co-acts with the roller 318 to actuate the crank arm 314 and the link 313 to cause the arm 312 to be rocked or moved away from the mandrel in position B thereby moving the gear 322 out of engagement with the mandrel gear 311 and at the same time releasing the pawl 309 and permitting the same to move back into latching engagement with said mandrel gear 311 to hold the mandrel locked against rotation with respect to the turret head preparatory to another step in the formation of the cup.

The partly formed cup blanks on the mandrel in position B are next acted upon by a folding or crimping mechanism adapted to fold over or crimp the lower glued margin of the cup body blank around the flange 106 of the cup bottom 105. The folding or crimping mechanism comprises a control cam 332 which is mounted on the cam shaft 77 adjacent the cam 95 (Figure 6). Co-acting with the cam 332 is a roller 333 supported on a connecting bar 334. The lower end of the connecting bar 334 has a yoke or fork member 335 formed thereon having sliding contact with said cam shaft 77 (Figures 32 and 33). The upper end of the connecting bar 334 is pivoted to a crank arm 336 fixed on one end of a stub shaft 337. The stub shaft 337 is journalled in a bearing bracket 338 integrally formed on a bearing bracket 339 mounted upon the outer face of one of the framework bracket plates 52.

Fixed on the other end of the stub shaft 337 is a crank arm 340, the free end of which projects between a pair of pins 341 carried in the bifurcated head 342 of a plunger rod 343 (Figures 4 and 45). A control spring 344 is engaged around the plunger rod 343 between the bearing bracket 339 and the bifurcated head 342 to normally hold the plunger rod retracted and the roller 333 in resilient contact with the cam 332. The inner end of the plunger rod 343 is provided in a pocket or chamber 345 in which a coiled spring 346 is sealed behind a piston rod 347 having a flat piston head 348 formed on the outer end thereof. The piston rod 347 is provided with a slot 349 which registers with shorter slots 350 formed in opposite sides of the chambered end of the plunger rod 343 (Figure 46). A pin 351 projects through the slots 349 and 350 and has the ends thereof secured in a follower ring 352 slidable on the plunger rod between the bearing bracket 339 and a plunger head 353 fixed on the inner end of said plunger rod. The plunger head 353 is provided with a plurality of passages or openings through which coiled springs 354 project. Slidably mounted on the piston rod 347 between the piston head 348 and the plunger head 353 is a crimper head or disk 355 having a plurality of pockets or recesses in one face thereof in which the ends of the coiled springs 354 are seated. The springs 354 also seat in recesses provided in one face of the follower ring 352. Integrally formed on the opposite face of the crimper head 355 are a plurality of sets or pairs of oppositely disposed crimper teeth 356. The pairs of teeth 356 are separated by flat arc shaped flanges 357.

After a body blank has been coiled around the mandrel in position B and around the flanged cup bottom, the latch pawl 309 is permitted to engage the gear 311 and hold the mandrel against rotation. The crimper control cam 332 now acts to operate the crank arm 340 and the plunger rod 343 to move the piston head 348 into resilient contact with the cup bottom blank 105 to hold the same in proper position while the spring controlled crimper head 355 is advanced so that the glued lower margin of the cup body blank is engaged between the teeth 356 which act to curl or crimp the glued margin of the cup body around the flange 106 of the cup bottom as illustrated in Figure 46. With the crimping of the glued margin of the cup body around the flange of the cup bottom completed, the cam 332 has rotated to release the crank arm 340 thereby permitting the compressed spring 344 to act to retract the crimping mechanisms and the piston feed 348 out of engagement with the crimped or bottom end of the cup being formed.

At this stage in the operation the Geneva gears 28 and 29 again act to rotate the shaft 26 and the turret head 30—31 one quarter of a revolution so that the mandrel 33 carrying the partly formed cup is moved from station B into station C to permit the cup to be completed by mechanisms adapted to press and roll the glued and crimped lower margin or base of the cup.

The cup bottom finishing mechanisms comprise a control cam 358 secured on the cam shaft 77 and having a roller 359 co-acting therewith. The roller 359 is mounted on a shiftable plate 360 having a slot therein through which the cam shaft 77 projects. Connected to the slotted plate 360 is a connecting rod 361 the upper end of which is pivoted to a crank arm 362 fixed on one end of a stub shaft 363 journalled in a bearing sleeve 364 integrally formed on the machine frame standard 23. Secured on the other end of the stub shaft 363 is a crank arm 365 to which a link 366 is connected. The link 366 is also pivoted to the lower end of an angle bar 367 fulcrumed intermediate its ends on a stub shaft 368 carried by a bracket 369 rigidly secured to the frame standard 23 (Figures 7 and 12). A control spring 370 is coiled around the stub shaft 368 and has one end secured to the bracket 369 and the other end engaged against the angle bar 367. Mounted on the upper end of the fulcrumed bar 367 is a cross-bar 371 (Figure 44) which carries a stub shaft 372 on which a frustum shaped outer presser roller 373 is freely rotatable. Also mounted on the cross-bar 371 is a rotatable inner presser disk or circular plate 374 provided with an enlarged flat flange 375. The inner presser plate 374 is adapted to be projected against the cup bottom 105 in contact with the glued crimped cup base, while the outer presser roller 373 is positioned adjacent the outer periphery of the body portion of the cup. This operation is accomplished by the action of the control cam 358 and the swinging of the upper end of the fulcrumed bar 367 toward the end of the mandrel in station C.

At this point in the operation the arm 312 is again lowered thereby causing a large gear 376 to be moved into meshing engagement with the mandrel gear 311 of the mandrel at station C to cause said mandrel and the partially completed cup thereon to be rotated. The latch pawl 309 associated with the mandrel gear 311 is of course first disengaged from said mandrel gear 311 by means of a suitable release finger or projection formed on the lower end of an arm or lever 377 on which said gear 376 is rotatably supported. The lever 377 is loosely mounted intermediate its ends on the stub shaft 323 carried by the arm 312. Also loosely mounted on said stub shaft 323 is the lower end of an arm or lever 378 having an angled projection 379 which carries a set screw 380 set to contact one edge of the fulcrumed lever 377 (Figure 7). Fixed on the projection 379 is an arm 381 to which one end of a coiled spring 382 is secured. The other end of the spring 382 is attached to the upper portion of the fulcrumed lever 377 to resiliently hold the lever 377 in contact with the set screw 380. Pivoted to one side of the upper end of the lever 378 is one end of a rod 383 the other end being pivoted on a bracket arm 384 formed on the side of the bracket 308. Fixed on the opposite side of the bracket 308 is a bent arm 385 on the upper end of which a channel or U-shaped head 386 is formed. The arms of the channel head 386 carry set screws 387 and 388 with the inner ends of said set screws positioned adjacent the side edges of the upper end of the lever 377. The set screws 387 and 388 are adapted to be adjusted to limit the pivotal movement of the lever 377 relative to the pivoted arm 312 on which it is pivotally supported at 323. The set screw 380 serves as a stop point for the upper end of the lever 377 in the upward swing of the arm 312 about the shaft 21 so that the lower end of the lever 377 will be forced to move outwardly to permit the gear 376 to be moved out of meshing engagement with the mandrel gear 311 in position C when the arm 312 is moved into a raised position.

When the gear 376 is in position to mesh with the mandrel gear 311 the mandrel in position C is rotated thereby permitting the outer roller 373 to roll or iron the base flange of the cup, pressing the same against the periphery of the inner presser plate 374, said roller 373 and the plate 374 having been moved into operative position by the action of the control cam 358.

After the glued portions of the cup have been pressed as described, the cup is completed and the pressing roller 373 and the presser plate 374 are retracted by the action of the spring 370 which acts to pivot the fulcrumed bar 367 back into its normal position. At this point in the operation the control cam 319 again acts to cause upward swinging of the arm 312 thereby moving the driving gear 376 out of engagement with the mandrel gear 311 at station C and permitting the latch pawl 309 to spring back into locking engagement with the mandrel gear 311 to again hold the mandrel in position C stationary with respect to the turret head 30—31.

The Geneva gears 28 and 29 now act to again rotate the turret head 30—31 one quarter of a revolution, thereby advance the mandrel 33 and the finished flat bottom cup 389 (Figure 49) from station C into station D. The next step in the operation is to remove the finished cup from the mandrel in station D. The mechanism provided for this purpose comprises a gripper control cam 390 secured on the cam shaft 21. Shiftably engaged on the gear 25 is a slotted cam bar 391 carrying an upper roller 392 which co-acts with the cam 390 (Figure 38). Also carried by the cam bar 391 is a shiftable bracket 393 supporting a lower roller 394 which also co-acts with the cam 390. A spring 395 on the bracket 393 acts to resiliently hold the lower roller 394 in contact with the cam 390 and furthermore serves to make said cam double acting. Attached to the lower end of the cam bar 391 is a rod 396 having its lower end pivoted to the short arm of a bell crank 397 pivoted on a bracket 398 fastened to the under face of the table 1. Connected to the long arm of the bell crank 397 is one end of a connecting rod 399 the other end of which is pivoted to a crank arm 400. The crank arm 400 is integrally formed on one end of the sleeve 235. Fixed on the other end of the sleeve 235 is a long crank arm 401 which projects upwardly through an opening in the table 1. Pivoted on the upper end of the crank arm 401 is one end of a rod 402 the other end of which is connected to the lower end of a tail plate or bracket plate 403. The bracket plate 403 is integrally formed on a sleeve 404 slidable on a longitudinally slotted guide bar 405 fastened to one side of one of the framework brackets 52. Fastened on the upper outer end of the guide bar 405 is a Z-bracket 406 which supports a stop plate or arm 407.

Formed on one side of the slide sleeve 404 is a housing 408 on the top of which a resilient angled arm or plate spring 409 is mounted to serve as a cup stop or guide. Pivotally mounted within the housing 408 is an upper gripper arm 410 and a lower gripper arm 411, the ends of which project from the housing 408 and are separated at one end by a coiled spring 412. An arc shaped upper gripper jaw 413 is formed on the end of the upper gripper bar 410 and is adapted to co-act with a lower gripper jaw 414 formed on the end of the lower gripper arm 411. The control spring 412 acts to normally hold the gripper jaws 413 and 414 in closed gripping position. Projecting through the gripper housing 408 is a cam shaft 415 on the projecting end of which an actuating lever 416 is secured. Mounted on the shaft 415 within the housing 408 is a double cam 417 (Figure 51) positioned between the gripper arms 410 and 411 to permit simultaneous operation thereof when the lever 416 is actuated by either the stop plate 407 or by a stop bracket or plate 418 fixed on the control cam 291 (Figure 49). Fixed on the bottom of the gripper housing 408 is a channel shaped cup stop 419. The depending sleeve plate 403 carries a projecting pin 420 (Figure 53).

When the gripper sleeve 404 is advanced from the dotted line position of Figure 49 into the full line position toward the cup on the mandrel 33 in station D, the gripper control cam 417 is positioned to hold the gripper jaws 413 and 414 in open position to permit the same to pass over the upper middle portion of the glued cup base flange. As the gripper jaws move into the position just mentioned, the cam control lever 416 is moved into contact with the end of the stop bracket 418 thereby causing the cam 417 to be rotated or rocked into the position illustrated in Figure 51. The compressed spring 412 now acts to automatically close the gripper jaws 413 and 414 to cause the same to grip the glued base margin or flange of the cup 389.

Referring now to Figure 9 it will be noted that as the cup carrying mandrel is advanced from station C to station D that communication between the valve plate air channels 39 and the passage 37 leading from the advancing mandrel is broken thereby cutting off the air suction in said mandrel. As the mandrel moves into station D the end of the mandrel air passage 37 is moved into register with the valve plate hole 41 leading to the atmosphere, thereby automatically relieving the vacuum in said mandrel and releasing the suction grip on the completed cup.

The resistance to stripping of the completed cup having been reduced, the control cam 390 now acts on the upper follower roller 392 to cause outward movement of the gripper mechanisms toward the dotted line position of Figure 53. The finished cup 389 engaged by the gripper jaws 413 and 414 and by the spring guide 409 is thus pulled from the mandrel in station D.

The gripper mechanisms carrying the completed cup slide outwardly on the slotted guide bar 405 until the gripper control cam lever 416 comes into contact with the end of the stop plate or arm 407. The lever 416 is thereby tipped into the dotted line position of Figure 49 rocking the cam 417 to cause the same to separate the gripper arms 410 and 411 and open the gripper jaws 413 and 414 to release the cup. The released cup is permitted to drop by gravity into a curved cup receiving trough or tray 421 (Figure 35) with the open end of the cup directed toward the machine. The trough 421 is stationary and is supported on a bracket arm 422 fixed on the front edge of the table 1 and projecting above the level of said table. Attached to the bracket arm 422 is a flat cup receiving or discharge table 423 having stop flanges 424 and 425 formed on two of the edges thereof. The table 423 may be held in position by brace legs or any other desired supports.

Normally positioned in alignment with the trough 421 is a cup stack receiving chute 426 of curved cross-section considerably longer than the trough 421 and having one margin partially cut away at 427 to afford a side discharge opening for a stack of nested cups. The cup discharge chute 426 is pivotally supported by a hinge bracket 428 to permit the chute to be tilted or tipped transversely of its longitudinal axis toward the table flange 425.

As each completed cup is pulled into release position above the cup trough 421, a cup counting or registering mechanism is operated. This is accomplished by means of the pin 420 (Figure 53) coming into contact with the side edges of the upper end of a lever 429 pivoted intermediate its ends to one of the frame bracket plates 52 adjacent a rounded bearing washer or pivot block 430. A retaining bolt 431 is used to support the lever 429 and the bearing washer 430 in position. The upper end of the fulcrumed lever 429 is provided with a beveled surface 432. Pivoted to the lower end of the lever 429 is one end of a connecting rod 433. The other end of the rod 433 is pivoted to the long arm of a bell crank 434 pivoted upon the table 1 (Figure 30). The short arm of the bell crank 434 is connected to one end of a slide bar 435 positioned upon the table 1 and slidable in guide straps 436 fixed on the table. Attached to the slide bar 435 is an arm 437 on which a counter pawl 438 is pivoted. The free end of the counter pawl 438 is resiliently held in engagement with the toothed periphery of a counter disk or ratchet 439 having a predetermined number of peripheral teeth and carrying two upwardly projecting studs or pins 440 positioned diametrically opposite one another. Attached to the counter pawl 438 is one end of a control spring 441 the other end being attached to the table 1. Each time a completed cup is pulled off of the mandrel and is deposited in the receiving trough 421 the pin 420 (Figure 53) acts to operate the counting mechanism to advance or rotate the counter disk 439 one tooth thereby gradually advancing one of the control pins 440 toward a predetermined point wherein it will be positioned to cause actuation of a tripping mechanism for the cup chute 426.

As the counter actuating pin 420 is moved against the side of the lever 429 said lever is pivoted, to actuate the counter pawl 438 and the counter disk 439 and said pin 420 is permitted to travel over the upper end of said lever 429 adjacent the beveled edge 432 of said lever. After a discharged cup has been counted, the counter control spring 441 now acts to move the slide bar 435 and the counter actuating mechanisms back into their normal positions. Upon the next inward movement of the gripper sleeve 404 the pin 420, on the plate 403, is advanced and rides over the beveled surface 432 of the lever 429 thereby pivoting or swinging the lever on the rounded bearing washer 430 so that the upper end of said lever swings toward the bracket plate 52 thereby permitting the pin 420 to pass the lever 429 without actuating the counter mechanisms.

With a cup having been counted and deposited in the receiving trough 421, a cup plunger rod 442 (Figure 30) is actuated to cause a pusher head 443 on one end thereof to be slidably advanced to pass into the deposited cup in the trough 421 and engage against the inner face of the cup bottom. The deposited cup is thus advanced or pushed out of the trough 421 and into the cup receiving chute 426 to be pushed into nested or stacked relation with a stack of previously formed cups. The plunger rod 442 is slidably supported in brackets 444 fixed on the top of the table 1. Pivoted to the inner end of the plunger rod 442 is one end of a connecting link 445 having the other end pivoted to the free end of a crank arm 446. The crank arm 446 is fixed on one end of a short shaft 447 journalled in bearing brackets 448 and 449 secured to the under face of the table 1. Also secured on the shaft 447 is a crank arm 450 to which one end of a link 451 is connected. The other end of the link 451 is pivotally connected to a connecting arm 452 fixed on the lower end of a vertical rod or shaft 453 journalled in a bearing sleeve 454 secured to the table 1. Fixed on the vertical shaft 453 below the sleeve 454 is a crank arm 455. Connected to the crank arm 455 is a slotted follower 456 slidable with respect to the cam shaft 88. A roller 457 is supported on the follower 456 and said roller co-acts with the periphery of a cup pusher control cam 458 mounted on the cam shaft 88 (Figure 6).

The finished cups are each individually counted and then pushed into nested engagement with previously counted and nested cups in the receiving chute 426. If desired a spring stop bar or plate may be provided above the chute 426 to serve as a stop to determine the position of the first cup discharged and to insure a stationary disposition of the stack of cups.

When the cups in the stack held by the chute 426 reach a predetermined number, one of the pins 440 on the counter disk 439 is advanced to cause actuation of a stack discharging mechanism. For this purpose the chute 426 has pivoted to one side thereof the upper end of a chute tipping rod 459 the lower end of which is pivoted to a crank arm 460 formed on a rocker sleeve 461 supported on a stub shaft 462 mounted on the machine framework. Also formed on the rocker sleeve 461 is a crank arm 463 adapted to be rocked periodically by a link 464 pivotally connected to an arm 465 secured on one end of a shaft 466 journalled in a bearing sleeve 467 mounted on one of the machine frame legs 2 (Figures 3 and 4). Secured on the other end of the rocker shaft 466 is a crank arm 468 to which the lower end of a connecting rod 469 is pivoted. The upper end of the rod 469 is pivotally connected eccentrically to a disk 470 loosely mounted on the power shaft 5 and frictionally rotatable thereby through the co-operation of a coiled spring 471 which serves to press the disk 470 against the face plate 472 fixed on the end of shaft 5.

Referring now to Figures 3 and 31, the disk 470 is normally held from rotating by a stop latch or pawl 473 having a chamfered or beveled end which normally engages a projection or tooth 474 formed on the periphery of the disk 470. The pawl 473 is slidable behind a guide strap 474 fixed on a bracket 475 secured to the machine table 1. The lower end of the pawl 473 is pivoted at 480 to a vibratory arm 476 resiliently supported by means of a coiled spring 477 engaged on a supporting pin or hook 478 fixed on the bracket 475. The spring 477 acts to hold the vibratory arm 476 in resilient contact with a bar 479 secured on one side of the reciprocating yoke or union 239.

Normally the beveled end of the pawl 273 is held in engagement with the tooth 474 of the disk 470, so that with each reciprocation of the adhesive pad control rod 238 and the yoke 239, the control arm 476 is permitted to swing downwardly about the pivot point 480 and against the face of the counter disk 439, thereby maintaining the pawl 473 in locking engagement with the disk 470. After a predetermined number of cups have been made and counted, the counter disk 470 is of course rotatably advanced into a position wherein one of the studs or pins 440 assumes a location directly beneath the end of the pivotal arm 476. With the descent of the arm 476 the free end thereof comes into contact with said pin 440 and pivots thereon causing the pivoted end of said arm 476 to swing downwardly, thereby pulling the latch pawl 473 out of locking engagement with the tooth 474 of the control disk 470. Upon such disengagement the disk 470 is rotated and the shaft 5 by reason of the frictional clutch effect of the end plate 472 against which the disk 470 is pressed by the spring 471. With the rotation of the disk 470 the connecting rod 469 is depressed, thereby causing actuation of the crank arms 463 and 460 and raising of the tipping rod 459. The cup stacking chute 426 is thus automatically tilted sidewise at a predetermined time thus causing the counted stack of flat bottomed cups in said chute to be ejected therefrom and delivered onto the cup stack receiving table 423 ready to be packed into a carton for storage or shipment.

The operation is as follows:—

In connection with the detailed description of the various auxiliary mechanisms comprising the flat bottomed cup forming machine of this invention, a somewhat detailed description of the operation of the respective mechanisms has already been given. It will therefore only be necessary to give a brief résumé of the operation of the machine embracing the embodiment illustrated and described.

To start the machine the hand lever 9 is operated so that a drive from the motor 15 is transmitted to the main shaft 5 and then to the various auxiliary mechanisms comprising the machine. The strip of prepared material 44 from the reel 43 is fed by means of the feed rollers 47 and 48 downwardly through the bottom blank punch mechanisms illustrated in Figure 32. The punch control cams 95 and 101 now actuate the punch mechanisms to cause a bottom blank 105 to be first punched from the material 44 and then forced through the forming die block 64 thereby causing the margin of the bottom blank to be bent to form a flange 106. The flanged cup bottom 105—106 is now pushed into engagement with the outer flat end of the mandrel 33 in station A and is held in place by air suction produced in the groove 107.

The cup body blanks 123 are supported in the magazine 113—115 upon the false bottom 122 which is adapted to be raised by the action of the spring 127 to position the uppermost cup body blank against a blank transfer device. The false bottom 122 is held in place by the frictional engagement of the edges of the stack of blanks with the liner plates 120.

The uppermost cup body blank 123 is now adapted to be removed from the top of the stack due to the action of the control cams 150, 175 and 203 (Figures 6, 11 and 21). The cam 150 acts to cause the blank transfer plate 187 to swing at a predetermined time, from the position illustrated in Figure 2 into a position limited by the stop screw 18, above the blank carrying magazine in time to permit the uppermost blank 123 to be moved into engagement therewith when the magazine bottom 122 is raised. The control cam 175 now acts to cause operation of the air valve 168 to connect the blank transfer block 187 with the air exhaust tank 4. The air is thus exhausted from the block 187 thereby causing the uppermost blank in the magazine to be gripped by suction to the under face of the transfer block 187. At this stage in the operation the spring 156 which was tensioned due to the action of the cam 150 on the roller 151 now acts to actuate the bell crank 157—160 and the rod 161 to swing the blank transfer block 187 back into the position illustrated in Figure 2. The gripped body blank 123 is thus transferred from the blank magazine into place over the glue applying mechanism in the glue tank 209.

The glue applying control cam 244 on the cam shaft 21 now acts on the roller 243 (Figure 40) to rock the shaft 225 thereby pivoting the arms 232 and 231 downwardly to actuate the telescoping connecting member 229. The outer end of the lever 219 is thus pulled downwardly causing the submerged glue applying pad 216—217 to be raised and resiliently pressed or stamped against the under face of the cup body blank 123 which is pressed against the under faces of the curved and straight arms of the transfer frame 208. Any upward rebound movement of the glue pad which might occur due to the action of the spring 230 is limited by the stop bracket or arm 228 by having the notched end of the bar 223 come into contact with said stop bracket. The gripping surface of the suction block 187 is sufficient to hold a cup blank against the bottom of the transfer frame 208 without any appreciable sag at the trailing end of the blank. A straight and a curved strip of glue is thus stamped or applied to the under surface of the cup body blank 123.

The suction release control cam 203 now reaches the position illustrated in Figure 21 thereby permitting the raised stem 196 to drop by gravity causing the pin 194 to actuate the cam arm 193 to swing the gripper block 187 downwardly about its hinge away from the plate 186. The vacuum or suction action in the block 187 is thus broken or released. The glued cup body blank is thereby automatically released and is permitted to be delivered to the cup body blank feed head 245 positioned as illustrated in Figure 2.

Referring now to Figure 15 and Figures 26 to 28 inclusive, the control cam 287 governing the air valve mechanism of the blank feed arm, now co-acts with the roller 286 to cause the rod 284 to actuate the lever 280 thereby causing the crank arm 279 to rock the shaft 277 and move the valve 273 into open position to cause an air suction action to take place in the apertured head 245. The glued cup body blank released from the transfer block 187 is thus pneumatically gripped by the cup blank feed head 245 ready to be fed into the machine for forming.

The feed arm control cam 272 at this stage in the operation, now co-acts with the roller 271 to operate the fulcrumed bar 269 and the connecting rod 268. The arm 264 is thus rocked thereby rocking the hollow shaft 261 to swing the feed arm 250 and the blank carrying head 245 from the position illustrated in Figure 2 toward the forming mandrel 33 in station A.

The blank feed head 245 is adapted to carry the glued cup body blank into the plane of the upper line or element of the frustum shaped mandrel so that the advance edge or margin of the glued blank is positioned over the row of the air suction apertures 34 and beneath the raised presser shoe 288 (Figure 7). The presser shoe 288 at station A is raised due to the action of the cam 291.

The valve control cam 287 Fig. 15 now acts to operate the valve 273 to move the slots 275 and 276 out of register with the air passages 253 and 252 respectively thereby breaking the air suction action in the feed head 245 since the free air port 278 now is in register with the passage 252. The glued cup blank is thus released by the feed head 245 after having been moved into contact with the forming mandrel 33 in station A and said feed head automatically moves back into the position shown in Figure 2 ready to receive another cup body blank.

Referring now to Figures 9 and 10 the mandrel air control valve cam 304 acting on the roller 303 actuates the arm 300 and the valve plate 38 to establish a communication between the air channel 39 and the passage 37 leading to the mandrel in station A. A suction action is thus created in the mandrel in the cup blank receiving position A, thereby causing the glued cup blank released by the blank feed head 245 to be pneumatically gripped or attracted by suction to said mandrel in a predetermined relation thereto.

The mandrel 33 in station A now has a cup bottom blank 105 and a glued cup body blank 123 affixed thereto by air suction. The Geneva gears 28 and 29 now act to rotate the shaft 26 and the turret head 30—31 through an arc of 90° to cause the blanks to be carried ahead by the forming mandrel in its translatory movement toward station B.

The mandrel 33, carrying the two cup blanks into station B, is locked against rotation by its latch pawl 309.

At this point in the operation the control cam 319 is in the position illustrated in Figure 9 to allow the arm 312 to drop by gravity into a position wherein the gear 322 meshes with the gear 311 of mandrel B and the roller 321 co-acts with the latch pawl 309 to push the same out of engagement with the gear 311 thereby unlocking the mandrel. The mutilated gear 328 at this time rotates the gear 325 thereby causing the mandrel B to be rotated twice so that the cup body blank 123 is tightly coiled about the mandrel under the pressure of the presser roller 305 which also acts to press the glued straight margin of the body blank against the other straight margin of said blank to form the body of the cup. The control cam 291 at this time is also positioned to permit the raised gripper shoe 288 to be moved by its control spring 299 into gripping engagement with the cup body blank to hold the same in place during the wrapping of said body blank around the mandrel and around the flange 106 of the cup bottom 105. The cam 319 now acts on the roller 318 to swing the arm 312 upwardly to move the gear 322 out of driving engagement with the mandrel gear 311 and at the same time releases the pawl 309 which automatically moves back into locking engagement with the gear 311 to hold mandrel B locked against rotation.

Referring now to Figures 32, 33 and 45, the folding or crimper control cam 332 co-acting with the roller 333 actuates the crank arm 336 and the shaft 337 thereby causing the crank arm 340 to operate the plunger rod 343 and move the piston head 348 into resilient contact with the cup bottom blank 105 to hold the same in proper position while the spring controlled crimper head 355 is advanced to engage the curved glued margin of the cup body blank and then bend or crimp the same around the flange 106 as shown in Figure 46. The cam 332 has by this time moved into a position to release the arm 340 thereby permitting the spring 344 to retract the crimping mechanisms and the piston head 348 out of engagement with the cup on mandrel B.

The Geneva gears 28 and 29 again act to rotate the turret head 30—31 one quarter of a revolution to cause the cup carrying mandrel to advance from station B into station C.

The control cam 358 at this time acts to cause the upper end of the fulcrumed bar 367 (Figure 12) to swing toward the end of the mandrel C to move the pressure plate 374 against the cup bottom 105 and in contact with the inner periphery of the glued crimped cup base, while the outer presser roller 373 is positioned adjacent the outer surface of the cup body. The arm 312 is again lowered at this point in the operation thus causing the gear 376 (Figure 7) to mesh with the gear 311 of mandrel C to rotate said mandrel and the cup carried thereby. The mandrel latch pawl 309 is first released by the release finger formed on the lower end of the lever 377 before rotation of mandrel C takes place. Rotation of the mandrel C and the cup thereon permits the outer roller 373 and the presser plate 374 to press or iron the base flange of the rotating cup to complete the cup. The presser roller 373 and the presser plate 374 are now retracted by the action of the spring 370 on the bar 367.

The control cam 319 again acts to swing the arm 312 upwardly to stop the rotation of mandrel C and the finished cup by permitting the latch pawl 309 to again engage the mandrel gear 311. The main Geneva gears 28 and 29 again operate at this time to rotate the turret head 30—31 one quarter of a revolution to advance the mandrel and the finish flat bottomed cup 389 (Figure 49) from station C into station D.

The next step in the operation is the removal of the cup from mandrel D. The control cam 390 (Figure 38) now acts through the roller 394 and the spring 395 to actuate the connecting rod 399 and the members 401 and 402 to cause the gripper sleeve 404 to advance from the dotted line position of Figure 49 toward the full line position with the gripper control cam 417 positioned to hold the gripper jaws 413 and 414 in open position to resiliently engage, due to the action of the spring 395 over a portion of the cup base flange.

The control lever 416 is now moved into contact with the stop bracket 418 to cause the cam 417 to be rocked into the position shown in Figure 51 thereby permitting the spring 412 to close the jaws 413 and 414 to grip the base flange of the cup. Referring now to Figure 9 it will be noted that as the mandrel is advanced from station C into station D, that communication between the valve plate channel 39 and the air passage leading from the advancing mandrel is broken thereby cutting off the air suction in said mandrel. The end of the mandrel air passage 37 now moves into register with the open air port 41 thus relieving the vacuum in the mandrel and breaking the suction grip on both the body portion and bottom of the completed cup. The resistance to stripping of the cup from mandrel D having been reduced, the control cam 390 now acts on the upper follower roller 392 (Figure 38) to cause the gripper mechanisms to move outwardly into the dotted line position of Figure 49. The cup is thus pulled off of the mandrel in station D gripped by the jaws 413 and 414. The cam control lever 416 now comes into contact with the stop plate 407 and is tipped to rock the cam 417 to cause opening of the gripper jaws and release of the cup.

The cup is permitted to drop by gravity into the stationary cup receiving tray 421 (Figure 35) with the open end of the cup directed toward the machine. As a cup is pulled from the forming mandrel the pin 420 (Figure 53) moves into contact with the pivoted lever 429 to operate the rod 433 and thereby cause the counter pawl 438 (Figure 30) to act on the counter disk 439 to rotate the same one tooth. After a cup has been counted, the spring 441 acts to return the counter mechanisms to normal position, the pin 420 riding over the beveled surface 432 tilting the lever 429 out of the way without actuating the counter mechanisms.

The cup pusher control cam 458 (Figure 6) now acts on the roller 457 to cause the crank arm 446 (Figure 8) and the link 445 to slide the plunger rod 442 outwardly to cause the plunger head 443 to enter the cup in the tray 421 and engage the cup bottom to push said cup out of the tray 421 into nested relation with previously formed and stacked cups in the chute 426.

The finished cups are each individually counted and then pushed into the chute 426 to be nested with other cups. When the cups in the chute 426 reach a predetermined number, one of the counter disk pins 440 (Figure 30) reaches a position under the end of the arm 476. With the next descent of the arm 476, the free end of said arm contacts the pin 440 and pivots thereon thereby causing the pivoted end of said arm 476 to move downwardly from the position illustrated in Figure 31. The latch pawl 473 is thereby pulled out of locking engagement with the tooth 474 of the control disk 470. The spring 471 now acts to hold the disk 470 in frictional contact with the end plate 472 to produce a friction clutch effect and cause rotation of said disk 470. The connecting rod 469 is thus depressed and actuates the crank arms 463 and 460 thereby raising the tipping rod 459. The cup stacking chute 426 is thus automatically tilted sidewise at a predetermined time to cause the counted stack of flat bottomed cups to be ejected from the chute and delivered upon the cup receiving table 423 ready to be packed in a carton for storage or shipment.

The rotary type of flat bottomed cup forming machine of this invention operates automatically as hereinbefore described to continuously carry a plurality of cups under construction through the machine in a rotary path through the various stations A, B, C and D so that as one cup is completed and ejected at station D another cup is started at station A. A rapid production flat bottomed cup making machine is thus provided to turn out flat bottomed glued cups in counted stacks ready for packing.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a machine of the class described, a bottom blank punching mechanism, a mandrel, a body blank support, mechanisms for feeding a bottom blank and a body blank to the mandrel, and gripping means for holding said blanks gripped on said mandrel.

2. In a machine of the character described, a bottom blank punching mechanism, an apertured mandrel, a body blank support, mechanisms for feeding a bottom blank and a body blank to the mandrel, and pneumatic gripping means adapted to grip the applied blanks to the end and side of said mandrel.

3. In a machine for making cups the combination with a mandrel, of a bottom blank punching mechanism, a body blank holder, mechanisms for feeding a bottom blank and a body blank to said mandrel, and cam controlled means adapted simultaneously to grip both of said blanks to said mandrel including pneumatic openings in the end and side of said mandrel.

4. In a cup machine the combination with an apertured mandrel, of a bottom blank punching, shaping and feed means, a body blank feed device, cam mechanisms for operating the feed means and said feed device to apply a plurality of blanks to the mandrel, and cam controlled pneumatic gripping means for gripping a bottom blank to the end of the mandrel and a body blank to the side of said mandrel.

5. In a cup making machine the combination with an apertured frustum shaped mandrel, of a bottom blank punching, flanging and feed means adapted to apply a flanged bottom blank to one end of the mandrel, a body blank feed device adapted to apply a body blank to one side of the mandrel, and pneumatic gripping means for gripping the applied blanks to said mandrel.

6. In a cup making machine the combination with a forming mandrel, of a pivoted presser, a rotatable support therefor, a spring for resiliently holding the presser in contact with the mandrel, a rotatable cam for moving the presser away from the mandrel, and eccentric means for operating said cam.

7. In a cup making machine the combination with a forming mandrel, of a movable presser, a rotatable support therefor a spring for holding the same in resilient contact with said mandrel, a rotatable cam for moving the presser away from said mandrel, eccentric means for operating said cam, and a second cam for controlling the operation of said eccentric means.

8. In a cup making machine the combination with a forming mandrel, of a spring controlled presser in resilient contact therewith, a rotatable support for carrying said presser cams for controlling the operation of said presser, eccentric means connecting said cams, and driving means for causing rotation of said cams.

9. In a cup forming machine the combination with a rotatable turret head, of forming mandrels thereon, a plurality of pressers rotatable with the turret head and adapted to contact said mandrels, a rotatable cam for successively moving said pressers out of engagement with said mandrels, eccentric means for operating said cam, and a cam for actuating said eccentric means.

10. In a cup forming machine the combination with a rotatable turret head, of means for operating the same, forming mandrels on said turret head, a plurality of pressers rotatable with the turret head and adapted to resiliently contact said mandrels, a rotatable cam for successively moving said pressers out of engagement with said mandrels, eccentric means for operating said rotatable cam, a cam for actuating said eccentric means, and means for rotating said last mentioned cam.

11. In a cup forming machine the combination with a rotatable turret head, of forming mandrels rotatably mounted thereon, a rotatable sprocket wheel, means for operating said turret head and said sprocket wheel, a plurality of presser members pivotally mounted on said sprocket wheel and co-acting with said mandrels, rollers on said presser members, a loose cam co-acting with said rollers for successively moving said pressers out of engagement with said mandrels, an eccentric for operating said loose cam, a roller on said eccentric, a cam co-acting with said roller to actuate said eccentric, and driving means for rotating said last mentioned cam.

12. In a machine of the class described the combination with a frustum shaped former mounted for rotation and for translation from one station to another in an arcuate path, of means to lock the former against rotation at one of said stations and during translation to said other station, means to affix a blank to said former at the first station, and a spring controlled presser pivotally supported adjacent said other station adapted to coil the affixed blank around the former while the former is rotated.

13. In a machine of the class described the combination with a frustum shaped former mounted for rotation and for translation from one station to another in an arcuate path, means to lock said former against rotation at one of said stations and during translation to another station, means to affix a blank to said former at the first station, a spring controlled pivoted presser translatable with the former, means adapted to release and rotate the former to cause the pivoted presser to coil the affixed blank on said former, mechanisms adapted to automatically connect and disconnect the former and the former rotating means, said affixing means including pneumatic gripper openings in said former, an exhaust device, and a valve controlling the energizing and de-energizing of said gripper openings.

14. In a cup making machine of the class described the combination with a rotatable turret head, means for intermittently rotating the same, a plurality of apertured frustum shaped mandrels rotatably supported thereon, and a pivoted presser associated with each of said mandrels and movable therewith through different stations of translation of said mandrels.

15. In an apparatus of the class described the combination with a plurality of rotatable mandrels translatable from station to station, pivoted spring controlled pressers translatable with said mandrels, means adapted to affix blanks to said mandrels at one of said stations, and release the respective pressers, mechanisms adapted to rotate said mandrels at another of said stations and also cause the respective pressers to move into coacting relation with the mandrels to assist in coiling the blanks around the mandrels, and means adapted automatically to operatively connect and disconnect said mandrel rotating mechanisms and said mandrels at said last mentioned station.

16. In a machine of the class described the combination with a plurality of rotatable mandrels and pivoted pressers translatable from station to station, means adapted to affix blanks to said mandrels at one of said stations when the pivoted pressers are released, means adapted to rotate said mandrels and release said pressers at another of said stations, and means adapted automatically to operatively connect and disconnect said mandrel rotating means and said mandrels at said last mentioned station including a driving gearing and driven pinions on said mandrels, an arm on which said driving gearing is mounted, and means to oscillate said arm to cause said driving gearing to mesh and unmesh with said driven pinions.

17. In a machine of the class described the combination with a plurality of translatable and rotatable frustum shaped mandrels having pneumatic openings in the side and outer end surfaces, means for positioning a plurality of blanks against the openings of one of said mandrels, means for gripping and pulling a formed cup from another of said mandrels, an air exhaust, air conduits leading from the mandrels to said exhaust and including an air chamber communicating with the openings in a plurality of said mandrels, a valve adapted to cut off communication of said air chamber with the openings in the discharging mandrel and to establish communication with the openings in the mandrel against which the blanks are being positioned, and means for periodically operating said valve.

18. In an apparatus of the character described the combination with a plurality of intermittently translatable frustum mandrels having pneumatic gripper openings in a plurality of surfaces thereof, mechanisms for applying a plurality of blanks to a mandrel over the openings therein at one station of rest of said mandrel, means for gluing one of said blanks previous to applying the blanks to said mandrel, pressers adjacent each of said mandrels, and means for rotating said mandrel at a second station of translation whereby the glued blank is coiled around the mandrel and the other blank thereon to form a cup.

19. In an apparatus of the character described the combination with a frustum mandrel, means for intermittently translating said mandrel in an endless path, means for gripping a glued blank and a plain blank to different surfaces of said mandrel, means for rotating the mandrel, during a period of rest from translation whereby said glued blank is coiled around the mandrel and around said plain blank, and a spring controlled presser adapted to press the glued blank against the mandrel during a substantial portion of translation of said mandrel.

20. In a machine of the class described the combination with a plurality of rotatable frustum shaped mandrels intermittently translatable in an endless path, mechanisms for simultaneously feeding a bottom blank and a glued body blank to a mandrel at one station of rest from translation, means for rotating a mandrel at another station, a pivoted presser travelling with said mandrel and a rotatable presser for pressing a body blank against the mandrel during rotation thereof to partially form a cup with a bottom blank, mechanisms for forming one end of a body blank around a bent margin of a bottom blank, means at a third station to complete the cup, and means for removing the cup from the mandrel at a fourth station of translation.

21. In a cup making machine of the class described the combination with a plurality of frustum mandrels intermittently translatable in an endless path, pivoted pressers translatable with said mandrels, means for feeding a pair of blanks to a mandrel from different directions at one station of rest from translation, means for gripping the blanks to said mandrel, means for rotating a mandrel at another station, rotatable presser means for assisting one of said pressers in pressing one of said blanks against the mandrel during rotation thereof whereby said blank is coiled around the mandrel and around the other blank to partially form a cup, means for crimping one blank around the other to complete a cup, mechanisms for pressing the crimped portion of the cup, means for releasing the grip on the cup at another station, and a mechanism for discharging the cup.

22. In a cup forming machine of the class described the combination with a plurality of rotatable frustum mandrels intermittently translatable through an endless path, mechanisms for feeding a bottom blank and a body blank to a mandrel at one station of rest from translation, means for gripping both of said blanks to the mandrel, means for rotating said mandrel at a second station, a rotatable presser and a pivoted presser acting on one of said blanks to cause the same to be coiled around the other blank on said mandrel to partially form a cup, a crimper mechanism at said second station acting to crimp the body blank around a margin of the bottom blank, a presser mechanism at a third station adapted to finish the crimped bottom portion of the cup, and means for removing the finished cup at a fourth station of translation.

23. In a cup forming machine of the class described the combination with a plurality of rotatable frustum mandrels, means for intermittingly translating the mandrels through an endless path, mechanisms for feeding a bottom blank and a body blank to a mandrel at one station of rest from translation, means for gripping both of said blanks to the mandrel, means for rotating said mandrel at a second station, a rotatable presser and a pivoted traveling presser acting on the body blank at said second station to cause the same to be coiled around the bottom blank, a crimper mechanism at said second station acting to crimp one margin of the body blank around a margin of the bottom blank, means at a third station of translation for ironing out the crimped portion of the blanks to complete a cup, means for releasing the grip on the cup at a fourth station, and means for discharging the completed cup at the fourth station.

24. In a cup making machine the combination with a turret head, means for intermittently rotating the same, a plurality of mandrels rotatably mounted on said turret head, means for normally locking said mandrels in non-rotative relationship to said turret head, mechanisms for feeding a flanged bottom blank and a glued body blank to a mandrel in one station of rest, means for gripping both of said blanks to different surfaces of said mandrel, mechanisms for releasing said locking means and for rotating said mandrel a plurality of times at a second station of rest of said turret head, a rotatable presser and a spring controlled pivoted presser for pressing the body blank against the mandrel and coiling said body blank around the flanged bottom blank during rotation of the mandrel, cam operated crimper means for folding one margin of the body blank around the flange of said bottom blank, means at a third station for again unlocking the mandrel and rotating the same, means at said third station for ironing out the folded margin of the body blank against the flange of the bottom blank, means for releasing the gripping means at a fourth station, and a gripper for pulling the cup from the mandrel.

25. In a cup making machine the combination with a mandrel, of means for applying a flanged bottom blank to one end of the mandrel, mechanisms for applying a glued body blank to the side of the mandrel, pressers coacting with the mandrel, means for rotating the mandrel to cause the glued body blank to be formed around the flanged bottom blank, a crimper adapted to bend a glued margin of the body blank around the flange of said bottom blank, and means for ironing the bent over margin of the body blank against said bottom blank flange to complete a cup.

26. In a cup making machine the combination with a suction blank gripping mandrel, of a rotatable presser coacting therewith, a pivoted presser coacting with said mandrel, and a blank crimper aligned with the mandrel to crimp one blank around another.

27. In a cup making machine the combination with a blank gripping mandrel, of a crimping mechanism coacting therewith and comprising a plunger, a spring controlled piston carried thereby for engaging a blank on said mandrel, a spring controlled crimper head supported on the plunger, and cam operated means for operating the plunger to cause the crimper head to crimp a margin of one blank around the margin of the blank held on said mandrel by the piston.

28. In a cup making machine the combination with a blank gripping mandrel, of a crimping mechanism coacting therewith and comprising a plunger, a spring controlled piston carried thereby for holding a blank centered on said mandrel, a spring controlled crimper head forming a part of the plunger, means for reciprocating the plunger and said crimper head to cause the crimper head to crimp a margin of a blank on the mandrel around the margin of the blank held by said piston, and cam operated means for actuating said plunger and crimper head.

29. In a cup making machine the combination with a mandrel, of means for gripping a pair of blanks thereon, a reciprocating plunger, a spring controlled piston carried thereby for holding one of said blanks centered on the end of the mandrel, a spring controlled crimper head forming a part of the plunger, teeth formed on said crimper head, means for operating the plunger and said crimper head to cause the crimper head teeth to crimp a margin of one of the blanks on the mandrel around the margin of the centered blank, means for operating the plunger and crimper head, a cam controlling said operating means, and a drive for said cam.

30. In a cup making machine the combination with a mandrel, means for gripping a body blank and a bottom blank thereto, a toothed crimper, a spring controlled plunger for actuating the same to cause the toothed crimper to crimp a margin of said bottom blank around a margin of said bottom blank, and cam controlled means for reciprocating the plunger and said toothed crimper.

31. In a cup making machine the combination with a mandrel, means for gripping a pair of blanks thereto, a toothed crimper, a plunger for actuating the same, a piston telescoped in said crimper and in said plunger, a spring in said plunger for holding the crimper projected to hold one of said blanks centered on the end of the mandrel, means for operating the plunger to cause the toothed crimper to crimp a margin of the second blank around the margin of the centered blank, a cam for actuating said operating means, and a driving means for rotating said cam.

32. In a cup making machine the combination with a blank gripping mandrel, of a cam controlled toothed crimper, means for operating the same to cause crimping of one blank around another to form a cup on the mandrel, and means for pressing and ironing the crimped portion of said cup.

33. In a cup making machine the combination with a blank gripping mandrel, of crimper means coacting therewith to cause the blanks on said mandrel to be crimped to form a cup base, and presser means for ironing and pressing the cup base.

34. In a cup forming machine the combination with a mandrel, of means for holding a flanged bottom blank against one end thereof, means for coiling a body blank around the bottom blank, a spring controlled crimper, means for operating the same to cause a margin of the body blank to be bent around the flange of the bottom blank to form a cup base, a plurality of pressers, and means for moving the same into contact with the cup base to complete the formation thereof.

35. In a cup forming machine, the combination with a mandrel, means for gripping a pair of blanks thereon, mechanisms for crimping a margin of one blank around a margin of another blank to form a cup base, a pivoted support, a plurality of pressers thereon, and means for moving said support toward the mandrel to cause the pressers to compress and iron the cup base.

36. In a machine of the class described the combination with a rotatable mandrel, of means for forming a flat bottomed cup thereon, means for rotating the mandrel and said cup, a plurality of pressers, and means for moving the pressers into engagement with the base of said rotating cup to press and iron the same to complete the formation of the cup.

37. In a machine of the class described the combination with a mandrel, mechanism for forming a flat bottomed cup thereon, means for rotating the mandrel and said cup, a plurality of pressers, a pivoted support therefor, and cam means for moving the pressers against the bottom and side of the cup to iron the base of the cup.

38. In a machine of the class described the combination with a rotatable mandrel, of means for forming a flat bottomed cup thereon, a plurality of pressers, and cam operated means for moving the pressers into engagement with the cup on the mandrel to iron and press the base portion of said cup.

39. In a machine of the class described the combination with a rotatable mandrel, of means for forming a flanged flat bottomed cup thereon, a pivoted support, a flanged presser plate thereon, a presser roller rotatably mounted on said support, cam controlled means for operating the pivoted support to cause the presser plate and the presser roller to be moved into contact with the cup to iron the flanged base thereof, and a driving means for operating said cam controlled means.

40. The combination with a cup forming mandrel carrying a cup having a flanged base portion, of a pivoted support, a plurality of pressers thereon, and a cam operated mechanism for operating the support to cause the pressers to be moved into engagement with the flanged cup base to press and complete the same.

41. In a cup making machine of the class described the combination with a rotatable mandrel having a flat bottomed cup gripped thereon, of a plurality of pressers, cam controlled means for moving said pressers into contact with the base end of the cup to finish the base thereon, and means for retracting the pressers after a finishing operation.

42. In a cup making machine the combination with a mandrel, of means for forming a flat bottomed cup thereon, a slidable sleeve, spring controlled grippers projecting therefrom, cam controlled means for reciprocating said sleeve, and means for actuating said grippers to cause the same to grip the cup and pull the same from the mandrel.

43. In a cup making machine the combination with a mandrel, of means for forming a cup thereon, a stationary support, a sleeve slidable thereon, spring controlled grippers in said sleeve, a cam for separating said grippers, a lever connected with said cam, cam controlled means for reciprocating said sleeve, and stop members coacting with said lever to actuate said cam to permit the grippers to grip a cup, pull the same from the mandrel and then release the cup.

44. The combination with a cup carrying mandrel, of a support, a sleeve slidable thereon, spring controlled gripping jaws pivotally mounted in said sleeve, a cam between said jaws, a lever connected with said cam, stationary stop members, and a cam operated mechanism for reciprocating said sleeve to cause the lever to coact with said stop members to operate the cam to permit the gripper jaws to grip the cup, pull the cup from the mandrel and then automatically release the cup.

45. The combination with a cup carrying mandrel, of a support, a carriage slidable thereon, gripper jaws pivoted therein, a spring for closing said gripper jaws to cause the same to grip said cup, cam operated means for reciprocating the carriage to cause the gripped cup to be pulled from the mandrel, a cam rocker between said gripper jaws, a lever connected therewith to actuate the cam rocker, stop members for operating the lever at the extreme limits of movement of said carriage to cause the gripper jaws to grip the cup and pull the same off of the mandrel and then release the cup, and a counting mechanism operated by the carriage to count the cup as it is being removed.

46. In a cup making machine the combination with a rotatable frustum shaped pneumatic mandrel, rotatable supporting means for carrying the mandrel through a plurality of stations, mechanisms for feeding a plurality of blanks to the mandrel at the first station, forming and crimping mechanisms at the second station for forming the blank into a flat bottomed cup, means at the third station for pressing and ironing the base portion of the formed cup, and mechanisms at the fourth station for releasing the cup and removing the same from the mandrel.

47. In a cup making machine the combination with a rotatable turret head, of a plurality of frustum mandrels, rotatably mounted thereon, a blank feed aligned with one of said mandrels, a blank crimping mechanism aligned with a mandrel in a second position, a blank pressing and ironing means associated with a mandrel in a third position, and a cup removing device associated with a mandrel in a fourth position.

48. In a cup forming machine the combination with a rotatable turret head carrying a pneumatic frustum mandrel, means for forming and applying a flanged bottom blank to said mandrel, mechanisms for relaying a glued body blank to the mandrel, means at another station of translation of the mandrel for forming the glued body blank around the flanged bottom blank and crimping a glued portion of said body blank around the flanged portion of said bottom blank to form a cup, a presser mechanism at a third station of translation of the mandrel for ironing the crimped glued portion of the cup, and means at the last station of translation of the mandrel for removing the completed cup from said mandrel.

In testimony whereof I have hereunto subscribed my name.

HAROLD CARLE.